(12) United States Patent
Yamada

(10) Patent No.: US 9,357,143 B2
(45) Date of Patent: May 31, 2016

(54) IMAGE PICKUP UNIT AND IMAGE PICKUP DISPLAY SYSTEM

(71) Applicant: Sony Corporation, Tokyo (JP)

(72) Inventor: Yasuhiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 13/870,156

(22) Filed: Apr. 25, 2013

(65) Prior Publication Data

US 2013/0335610 A1  Dec. 19, 2013

(30) Foreign Application Priority Data

Jun. 13, 2012  (JP) .................................. 2012133857

(51) Int. Cl.
| | |
|---|---|
| *H04N 5/335* | (2011.01) |
| *H04N 5/225* | (2006.01) |
| *H04N 5/351* | (2011.01) |
| *H04N 5/32* | (2006.01) |
| *H04N 5/359* | (2011.01) |

(52) U.S. Cl.
CPC ................. *H04N 5/351* (2013.01); *H04N 5/32* (2013.01); *H04N 5/3591* (2013.01)

(58) Field of Classification Search
CPC ............ H01L 27/14643; H01L 31/103; H01L 31/105; H01L 31/1804; H01L 31/1864; H01L 31/1892; Y02E 10/547
USPC .................................................... 348/294, 308
See application file for complete search history.

(56) References Cited

U.S. PATENT DOCUMENTS

| | | | | |
|---|---|---|---|---|
| 2004/0251509 | A1* | 12/2004 | Choi | ............................ 257/432 |
| 2006/0180774 | A1* | 8/2006 | Endo | ..................... G01T 1/2928 250/485.1 |
| 2008/0317454 | A1* | 12/2008 | Onuki | .......................... 396/128 |
| 2009/0008687 | A1* | 1/2009 | Katsuno et al. | ................ 257/292 |
| 2011/0049588 | A1* | 3/2011 | Isobe et al. | .................... 257/290 |
| 2012/0242874 | A1* | 9/2012 | Noudo | ................ H01L 27/1464 348/294 |

FOREIGN PATENT DOCUMENTS

| | | |
|---|---|---|
| JP | 2008-277710 | 11/2008 |
| JP | 2011-014752 | 1/2011 |

* cited by examiner

*Primary Examiner* — Trung Diep
(74) *Attorney, Agent, or Firm* — Chip Law Group

(57) ABSTRACT

An image pickup unit includes: a plurality of pixels each including a photoelectric conversion device and a field-effect transistor. Each of the pixels includes a light-blocking layer in a peripheral region of the photoelectric conversion device, and the light-blocking layer is maintained to a predetermined electric potential.

14 Claims, 20 Drawing Sheets

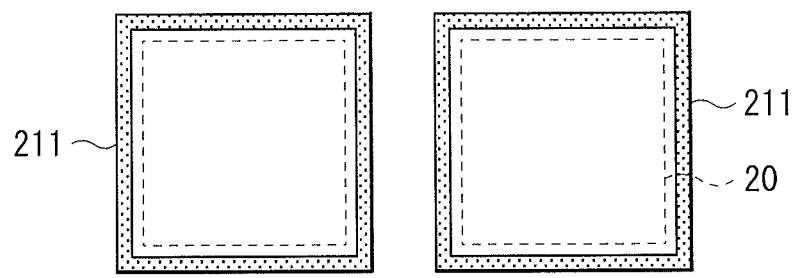
FIG. 7A
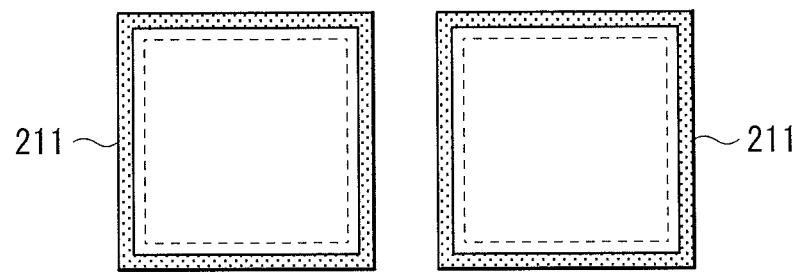
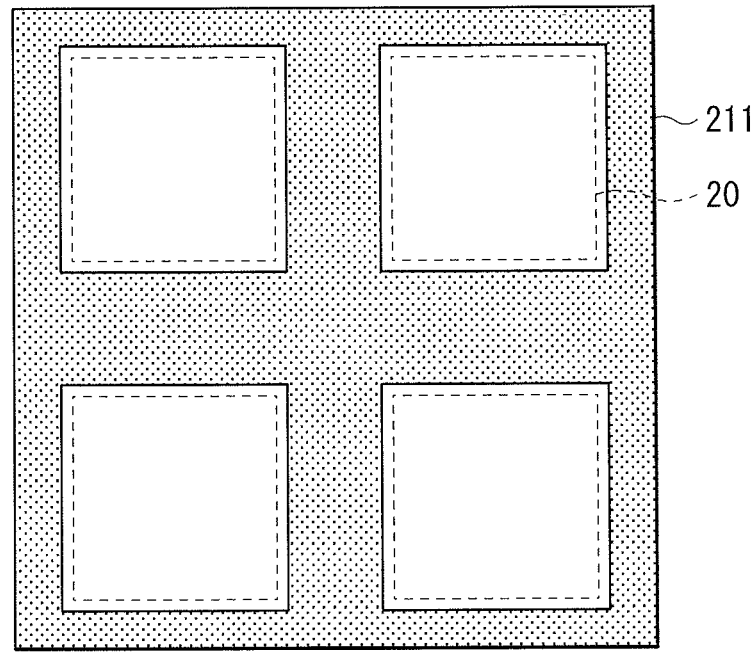
FIG. 7B

IMAGE PICKUP UNIT AND IMAGE PICKUP DISPLAY SYSTEM

BACKGROUND

The present disclosure relates to an image pickup unit suitable for use in X-ray photography for medical and non-destructive inspection applications for example, and an image pickup display system using such an image pickup unit.

Recently, there has been developed an image pickup unit such as a human chest X-ray photography unit, which acquires an image based on radiation rays in a form of an electric signal without any radiographic film. Such an image pickup unit has pixels each of which includes a photoelectric conversion device and a field-effect thin film transistor (TFT). Signal charges accumulated in a pixel are read out with a pixel circuit including a transistor to acquire an electric signal based on the quantity of radiation rays.

Examples of the photoelectric conversion device used in such an image pickup unit include a positive intrinsic negative (PIN) photodiode. The PIN photodiode has a structure where a so-called i-type semiconductor layer (intrinsic semiconductor layer) is interposed between a p-type semiconductor layer and an n-type semiconductor layer, which may output signal charges having the amount corresponding to the quantity of incident light (for example, see Japanese Unexamined Patent Application Publication Nos. 2008-277710 and 2011-14752).

SUMMARY

In the image pickup unit including the photoelectric conversion device as described above, however, outside light and/or stray light may be incident on each pixel, or crosstalk may occur between adjacent pixels, resulting in degradation in image quality.

It is desirable to provide an image pickup unit that improves image quality of a captured image, and an image pickup display system including such an image pickup unit.

An image pickup unit according to an embodiment of the disclosure includes: a plurality of pixels each including a photoelectric conversion device and a field-effect transistor. Each of the pixels includes a light-blocking layer in a peripheral region of the photoelectric conversion device, and the light-blocking layer is maintained to a predetermined electric potential.

An image pickup display system according to an embodiment of the disclosure is provided with an image pickup unit and a display unit that performs image display based on an image pickup signal obtained by the image pickup unit. The image pickup unit includes: a plurality of pixels each including a photoelectric conversion device and a field-effect transistor. Each of the pixels includes a light-blocking layer in a peripheral region of the photoelectric conversion device, and the light-blocking layer is maintained to a predetermined electric potential.

Each of the image pickup unit and the image pickup display system according to the above-described respective embodiments of the disclosure includes the plurality of pixels each including the photoelectric conversion device and the field-effect transistor, and includes the light-blocking layer that is maintained to a predetermined electric potential in the peripheral region of each of the photoelectric conversion devices. This reduces electrical influence of the light-blocking layer on each pixel, and suppresses leakage of light into an adjacent pixel, resulting in a reduction in occurrence of crosstalk between the pixels.

According to the image pickup unit and the image pickup display system of the above-described respective embodiments of the disclosure, the light-blocking layer is provided in the peripheral region of the photoelectric conversion device in each of the pixels, and the light-blocking layer is maintained to a predetermined electric potential. This reduces electrical influence of the light-blocking layer on each pixel, and suppresses crosstalk between the pixels. Hence, it is possible to improve image quality of a captured image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 7A and 7B are schematic views each illustrating an exemplary layout of a grid metal layer.

DETAILED DESCRIPTION

Hereinafter, some embodiments of the disclosure will be described in detail with reference to the accompanying drawings. It is to be noted that description is made in the following order.

1. First embodiment (example of an image pickup unit having a grid metal layer provided in a lower layer than a photoelectric conversion device).

2. Modification 1 (example where a grid metal layer is in the same layer as that of a gate electrode of a transistor).

3. Modification 2 (example where a grid metal layer is further disposed in a formation region of a transistor).

4. Second embodiment (example of an image pickup unit having a grid metal layer provided in an upper layer than a photoelectric conversion device).

5. Modification 3 (example where a grid metal layer is provided in an upper layer and a lower layer than a photoelectric conversion device).

6. Modifications 4-1 and 4-2 (another example of a passive pixel circuit).

7. Modifications 5-1 and 5-2 (examples of an active pixel circuit).

8. Modifications 6-1 and 6-2 (examples of an indirect-conversion image pickup unit).

9. Modification 7 (example of a direct-conversion image pickup unit).

10. Application example (example of an image pickup display system).

First Embodiment

Configuration

Figure 1:
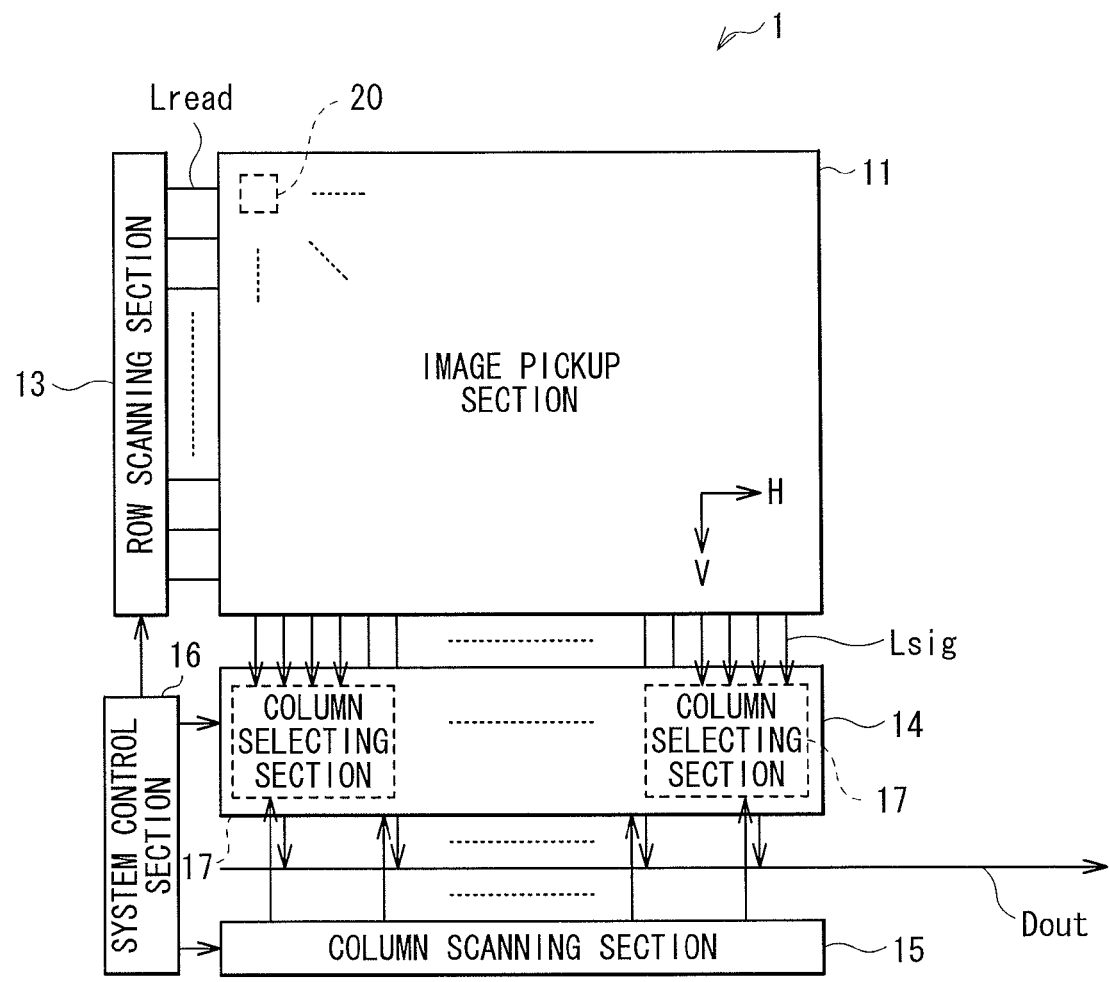
FIG. 1 is a block diagram illustrating an exemplary overall configuration of an image pickup unit according to a first embodiment of the disclosure.

FIG. 1 illustrates an overall block configuration of an image pickup unit (image pickup unit 1) according to a first embodiment of the disclosure. The image pickup unit 1 reads information of a subject (takes an image of a subject) based on incident light (image-pickup light). The image pickup unit 1 may include, for example, an image pickup section 11, a row scanning section 13, an A/D conversion section 14, a column scanning section 15, and a system control section 16.

(Image Pickup Section 11)

The image pickup section 11 generates an electric signal in response to incident light (image-pickup light). In the image pickup section 11, pixels (image-pickup pixels, or unit pixels) 20 are two-dimensionally arranged in a matrix, and each pixel 20 has a photoelectric conversion device (photoelectric conversion device 21 described later) that generates photoelectric charges with the amount corresponding to the quantity of incident light and internally accumulates the photoelectric charge. It is to be noted that, as illustrated in FIG. 1, hereinafter, a horizontal direction (row direction) is represented as "H" direction, and a vertical direction (column direction) is represented as "V" direction in the image pickup section 11.

Figure 2:
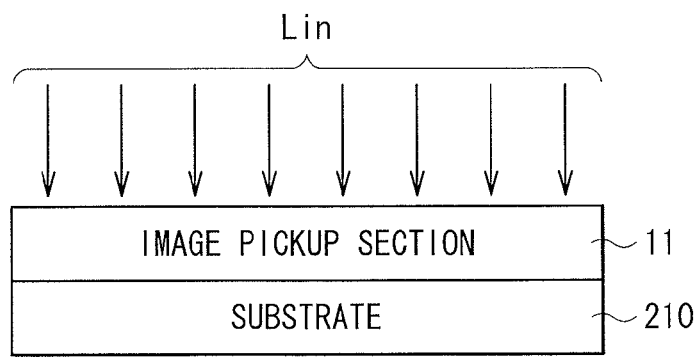
FIG. 2 is a schematic view illustrating an exemplary schematic configuration of an image pickup section illustrated in FIG. 1.

As illustrated in FIG. 2, the image pickup section 11 may be, for example, provided on a substrate 210, and has the photoelectric conversion device 21 and a field-effect transistor 22 for each of the pixels 20. It is to be noted that, for example, a wavelength conversion layer described later may be provided on the top of the image pickup section 11 or on the back of the substrate 210, so that the image pickup unit 1 may be used as a so-called indirect-conversion radiographic image pickup unit, for example.

Figure 3:
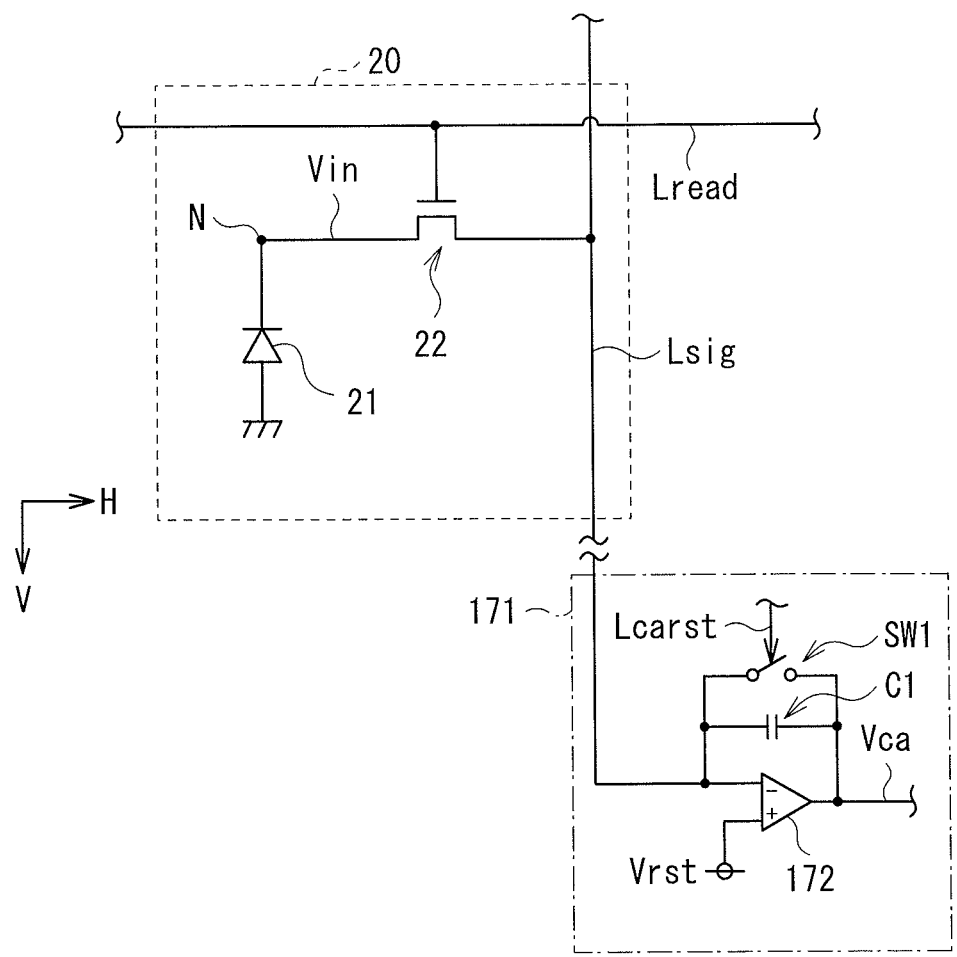
FIG. 3 is a circuit diagram illustrating an exemplary detailed configuration of a pixel and other components illustrated in FIG. 1.

FIG. 3 illustrates a circuit configuration (so-called passive circuit configuration) of the pixel 20 together with a circuit configuration of a charge amplifier circuit 171 described later within the A/D conversion section 14. The passive pixel 20 includes one photoelectric conversion device 21 and one transistor 22. In addition, the pixel 20 is connected to a readout control line Lread (a gate line, or a scan line) extending in the H direction, and to a signal Lsig extending in the V direction.

The photoelectric conversion device 21 may be configured of, for example, a positive intrinsic negative (PIN) photodiode or a metal-insulator-semiconductor (MIS) sensor, and generates signal charges with the amount corresponding to the quantity of incident light (image-pickup light Lin) as described above. It is to be noted that the cathode of the photoelectric conversion device 21 is connected to a storage node N in this embodiment. A specific configuration of the pixel including the photoelectric conversion device 21 is described later.

The transistor 22 is a transistor (readout transistor) that is turned on in response to a row scanning signal supplied from the readout control line Lread, and thus outputs signal charges (input voltage Vin) acquired by the photoelectric conversion device 21 to the signal line Lsig. The transistor 22 is configured of an N-channel (N-type) field-effect transistor (FET) in this embodiment. The transistor 22, however, may be a P-channel (P-type) FET, etc. In the pixel 20, a gate of the transistor 22 is connected to the readout control line Lread, a source (or drain) thereof may be connected to, for example, the signal line Lsig, and a drain (or source) thereof may be connected to, for example, the cathode of the photoelectric conversion device 21 via the storage node N. The anode of the photoelectric conversion device 21 is connected to the ground (grounded) in this embodiment.

The row scanning section 13 includes predetermined circuits such as a shift-register circuit and a logic circuit, and serves as a pixel driving section (a row scanning circuit) that performs drive (line-sequential scan) of the plurality of pixels 20 in the image pickup section 11 in rows (in horizontal lines). Specifically, the row scanning section 13 may perform image-pickup operation such as readout operation described later by line-sequential scan, for example. It is to be noted that the line-sequential scan may be performed through supply of the above-described row scanning signal to each pixel 20 via the readout control line Lread.

The A/D conversion section 14 has a plurality of column selecting sections 17, which are provided one for each of a plurality of (four in this embodiment) signal lines Lsig, and performs analog-to-digital conversion (A/D conversion) based on a signal voltage (signal charge) received through each signal line Lsig. As a result, output data Dout (an image-pickup signal) in a form of a digital signal is generated, and is output to the outside.

Each column selecting section 17 may include, for example, the charge amplifier circuit 171 (FIG. 3) including a charge amplifier 172, a capacitive element (a capacitor, or a feedback capacitive element) C1, and a switch SW1, and undepicted components including a sample-hold (S/H) circuit, a multiplexer circuit (selection circuit), and an A/D converter.

The charge amplifier 172 is an amplifier for converting a signal charge read out from the signal line Lsig to a voltage (Q-V conversion). The minus (−) input terminal of the charge amplifier 172 is connected to one end of the signal line Lsig, and the plus (+) input terminal thereof receives a predetermined reset voltage Vrst. Feedback connection is established between the output terminal and the minus input terminal of the charge amplifier 172 via a parallel connection circuit of the capacitive element C1 and the switch SW1. Specifically, one terminal of the capacitive element C1 is connected to the minus input terminal of the charge amplifier 172, and the other terminal thereof is connected to the output terminal of the charge amplifier 172. Similarly, one terminal of the switch SW1 is connected to the minus input terminal of the charge amplifier 172, and the other terminal thereof is connected to the output terminal of the charge amplifier 172. It is to be noted that the on/off state of the switch SW1 is controlled by a control signal (an amplifier reset control signal) supplied from the system control section 16 through an amplifier reset control line Lcarst.

The column scanning section 15 may include, for example, undepicted components such as a shift register and an address decoder, and drives in sequence the column selecting sections 17. The signals (the above-described output data Dout), which have been read out from the pixels 20 through the signal lines Lsig, are sequentially output to the outside through selective scan by the column scanning section 15.

The system control section 16 controls operation of each of the row scanning section 13, the A/D conversion section 14, and the column scanning section 15. Specifically, the system control section 16 has a timing generator that generates various timing signals (control signals), and controls drive of each of the row scanning section 13, the A/D conversion section 14, and the column scanning section 15 based on the timing signals generated by the timing generator. The row scanning section 13, the A/D conversion section 14, and the column scanning section 15 each perform image-pickup driving (line-sequential image-pickup driving) of the pixels 20 based on the control by the system control section 16, so that the output data Dout are acquired from the image pickup section 11.

(Detailed Configuration of Pixel 20)

Figure 4:
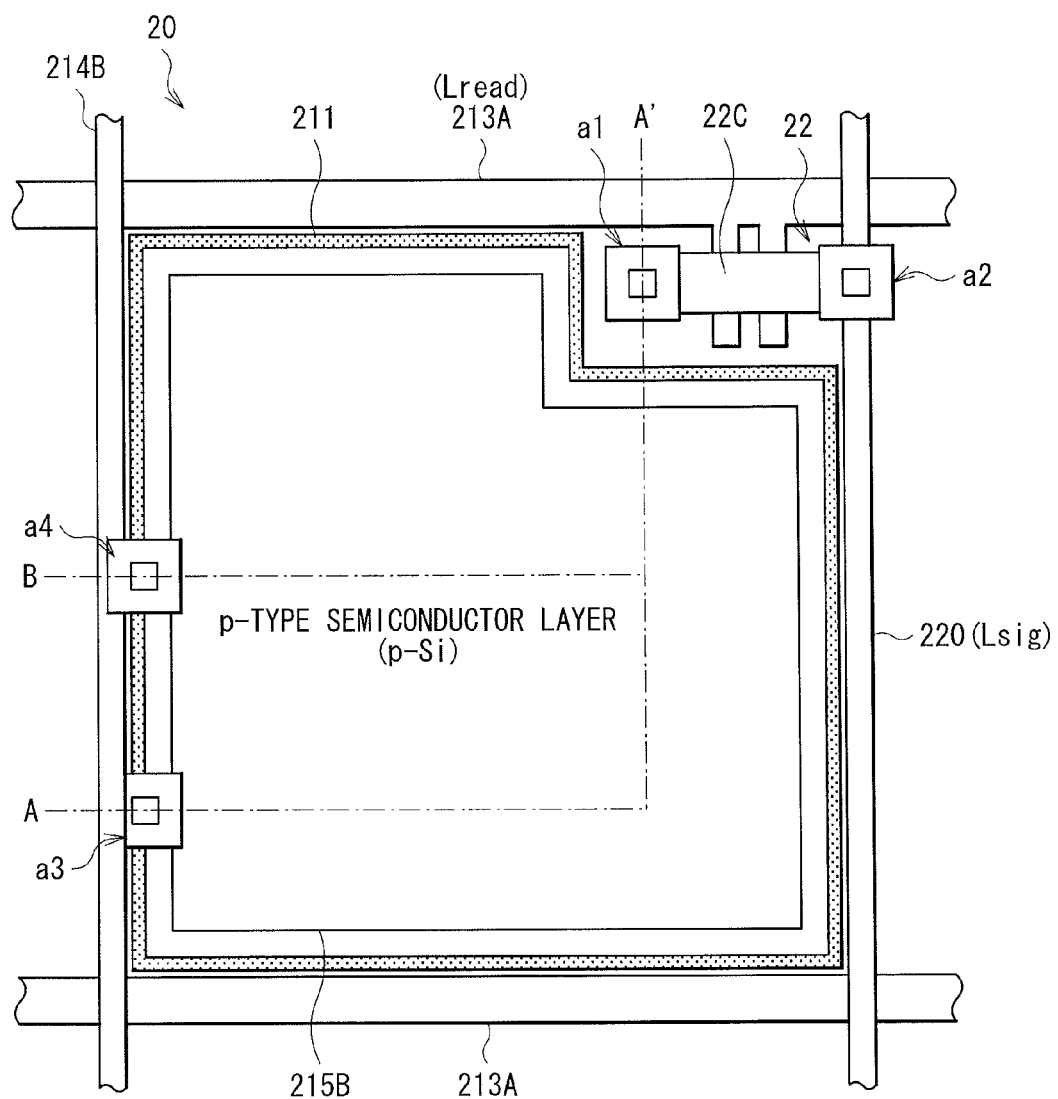
FIG. 4 is a schematic view illustrating an exemplary planar configuration of a relevant part of the pixel illustrated in FIG. 1.
Figure 5:
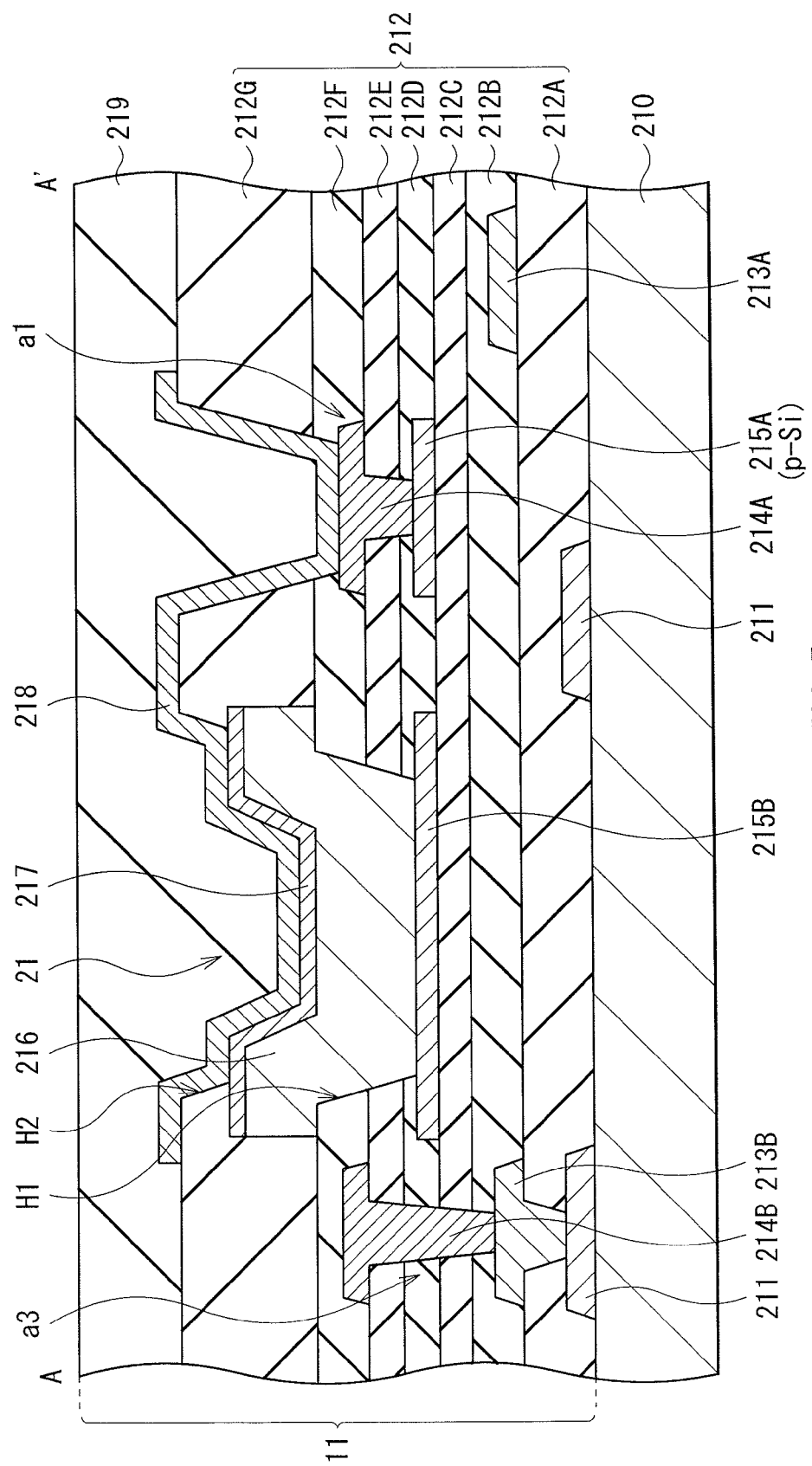
FIG. 5 is a sectional view of a region corresponding to a line A-A' of the pixel illustrated in FIG. 4.
Figure 6:
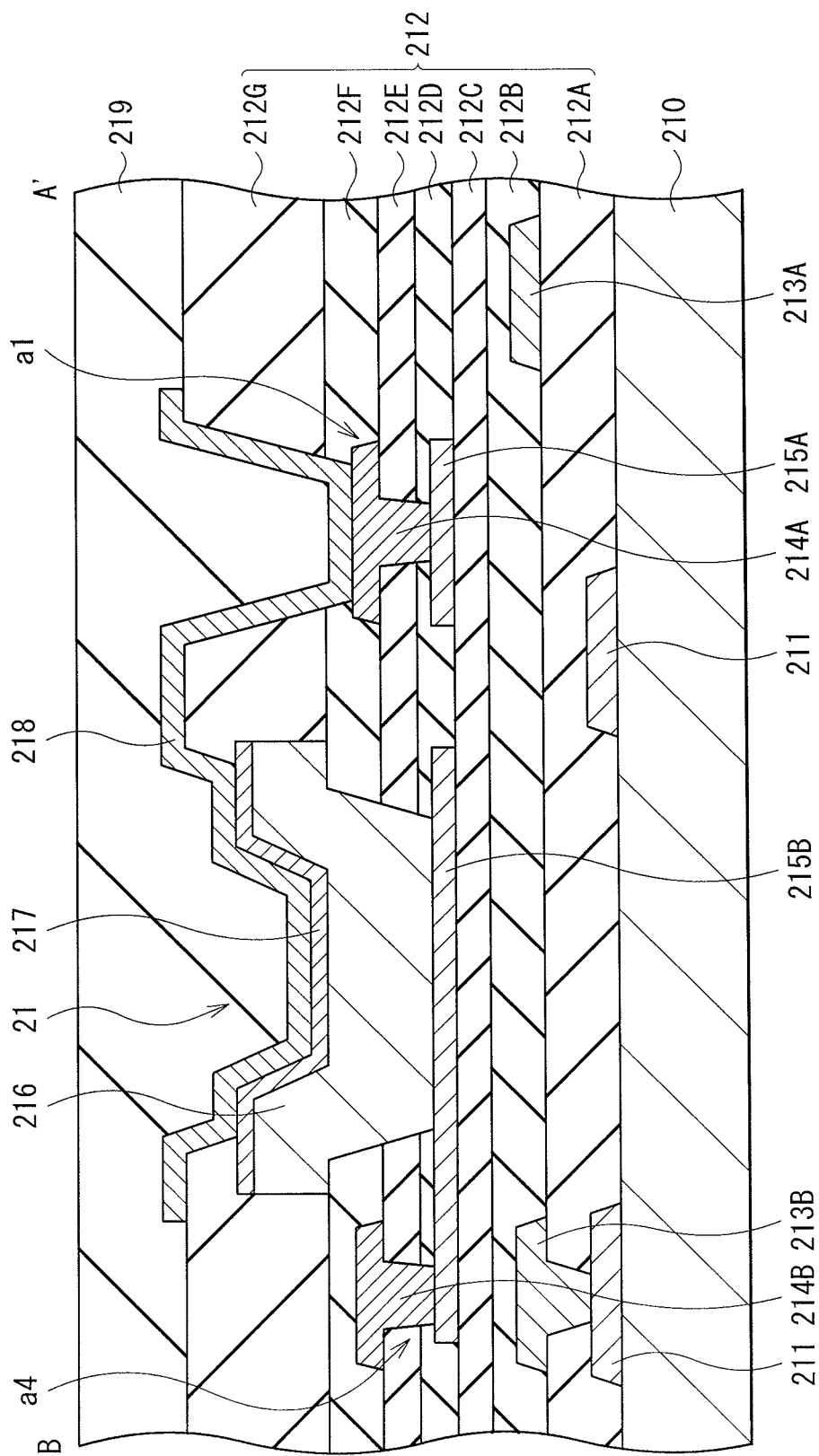
FIG. 6 is a sectional view of a region corresponding to a line B-A' of the pixel illustrated in FIG. 4.

FIG. 4 illustrates an exemplary planar configuration of a relevant part of the pixel 20. FIG. 5 illustrates a sectional configuration of a region corresponding to a line A-A' in FIG. 4. FIG. 6 illustrates a sectional configuration of a region corresponding to a line B-A' in FIG. 4. Although the photoelectric conversion device 21 and the transistor 22 are disposed in the pixel 20 as illustrated in the drawings, FIG. 4 illustrates only a p-type semiconductor layer 215B as a formation region of the photoelectric conversion device 21, and eliminates the illustration of other components for simplification (the same holds true in an exemplary planar configuration of a relevant part illustrated in FIG. 9 or later).

As illustrated in FIGS. 5 and 6, for example, the photoelectric conversion device 21 may include the p-type semiconductor layer 215B, an i-type semiconductor layer 216, and an n-type semiconductor layer 217 that may be stacked in this order on the substrate 210 with a part (interlayer insulating films 212A to 212C) of an interlayer insulating film 212 in between. Specifically, the p-type semiconductor layer 215B is provided in a selective region on the substrate 210 (in detail, on the interlayer insulating films 212A to 212C), and interlayer insulating films 212D to 212F, each having a contact hole H1 therethrough, are provided in opposition to the p-type semiconductor layer 215B. The i-type semiconductor layer 216 is so provided as to fill the contact hole H1 on the p-type semiconductor layer 215B, and the n-type semiconductor layer 217 is provided on the i-type semiconductor layer 216. An interlayer insulating film (a sidewall protective film) 212G is provided covering a sidewall of each of the i-type semiconductor layer 216 and the n-type semiconductor layer 217. The interlayer insulating film 212G has a contact hole H2 therethrough in opposition to the n-type semiconductor layer 217, and an upper electrode 218 is connected to the top of the n-type semiconductor layer 217 through the contact hole H2. It is to be noted that although the photoelectric conversion device 21 of the first embodiment is exemplified with a configuration where the i-type semiconductor layer 216 and the n-type semiconductor layer 217 are stacked in this order on the p-type semiconductor layer 215B, the stacking order of p, i, and n is not limited thereto, and the i-type semiconductor layer and the p-type semiconductor layer may be stacked in this order on the n-type semiconductor layer. In such a case, the n-type semiconductor layer is connected to the transistor section, and the p-type semiconductor layer and the upper electrode 218 are maintained to the ground potential (or fixed potential).

The interlayer insulating film 212 (interlayer insulating films 212A to 212G) may be formed of, for example, silicon oxide ($SiO_x$), silicon oxynitride (SiON), or silicon nitride ($SiN_x$).

The p-type semiconductor layer 215B is preferably formed of, for example, polycrystalline silicon (polysilicon). For example, the p-type semiconductor layer 215B may include low-temperature polysilicon to have a low resistivity, eliminating necessity of separately providing a lower electrode including a metal material (the p-type semiconductor layer 215B functions as the lower electrode). It is to be noted that the photoelectric conversion device 21 may be connected at the p-type semiconductor layer 215B to, for example, a power line for supply of reference potential to discharge the charges. In the case where signal charges are extracted through the p-type semiconductor layer 215B, the p-type semiconductor layer 215B is connected to the storage node N (the p-type semiconductor layer 215B also serves as the storage node N). Moreover, although description is made here with an exemplary case where the p-type semiconductor layer 215B is formed of low-temperature polysilicon, the p-type semiconductor layer 215B may be formed of microcrystalline silicon or amorphous silicon. However, use of low-temperature polysilicon eliminates necessity of the metal electrode as described above, which is therefore preferred. Furthermore, a p-type semiconductor layer including amorphous silicon, the i-type semiconductor layer 216, and the n-type semiconductor layer 217 may be stacked on the p-type semiconductor layer 215B (polysilicon). Alternatively, an n-type semiconductor layer (amorphous silicon), an i-type semiconductor layer, and a p-type semiconductor layer may be stacked in this order on the n-type semiconductor layer (polysilicon).

The i-type semiconductor layer 216 is a non-doped intrinsic semiconductor layer, and may be formed of, for example, amorphous silicon. The i-type semiconductor layer 216 has a thickness of, for example, about 400 nm to about 2000 nm both inclusive, and has a higher photosensitivity with an increases in the thickness. In particular, in the case of the structure where the p-type semiconductor layer 215B, the i-type semiconductor layer 216, and the n-type semiconductor layer 217 are vertically stacked as in the first embodiment, large thickness of the i-type semiconductor layer 216 is easily ensured compared with a so-called planar structure (a structure where an i-type semiconductor layer is horizontally interposed between a p-type semiconductor layer and an n-type semiconductor layer). Consequently, photosensitivity is improved in the structure of the first embodiment compared with the planar structure.

The n-type semiconductor layer 217 may be formed of, for example, amorphous silicon, and forms an n+ region. The n-type semiconductor layer 217 may have a thickness of, for example, about 10 nm to about 50 nm both inclusive. It is to be noted that the n-type semiconductor layer 217 and the i-type semiconductor layer 216 in FIG. 4 are each formed to be superimposed on the p-type semiconductor layer 215B to have substantially the same shape as that of the p-type semiconductor layer 215B.

The upper electrode 218 is an electrode for extraction of charges, and may be, for example, connected to the storage node N, i.e., also serves as the storage node N, and may be further connected to, for example, the source of the transistor 22 via a contact a1, i.e., a wiring layer 214A and an n-type semiconductor layer 215A. The n-type semiconductor layer 215A may be provided in the same layer as the p-type semiconductor layer 215B, for example, and may include, for example, low-temperature polysilicon as with the p-type semiconductor layer 215B. For example, the drain of the transistor 22 may be connected to the signal line 220 (Lsig) via a contact a2. The upper electrode 218 may be formed of, for example, a transparent conductive film such as an indium tin oxide (ITO) film.

The protective layer 219 may be formed of, for example, silicon nitride (SiN$_x$).

(Grid Metal Layer 211)

At least a portion of a grid metal layer 211 (which is also referred to as a light-blocking layer) is located at a periphery of the photoelectric conversion device 21. The grid metal layer 211 is provided in a region surrounding the p-type semiconductor layer 215B. In each pixel 20, as illustrated in FIG. 4, for example, the transistor 22 may be provided at a corner of a substantially rectangular (or square) region in which the photoelectric conversion device 21 is provided in a region other than the formation region of the transistor 22. In the first embodiment, the grid metal layer 211 is provided enclosing the photoelectric conversion device 21 (the p-type semiconductor layer 215B) located at a periphery of the photoelectric conversion device 21 along a surface pattern of the photoelectric conversion device 21. Moreover, in each pixel 20, the wiring layer (the signal line Lsig, the readout control line Lread, and the GND line 214B) is provided enclosing, in a lattice pattern, the region in which the photoelectric conversion device 21 and the transistor 22 are formed. Part or overall of the grid metal layer 211 is preferably provided in opposition to the wiring layer. Although FIG. 4 illustrates each side of the grid metal layer 211 to be parallel to the signal line 220 or the readout control line 213A, the grid metal layer 211 and the wiring layer are actually disposed to be opposed to (superimposed on) each other. The grid metal layer 211, however, is preferably disposed to be not opposed to (not superimposed on) the signal line 220. In particular, in the application of a flat panel display (FPD), an increase in capacitive coupling between the grid metal layer 211 and the signal line 220 leads to an increase in so-called Johnson noise; hence, the grid metal layer 211 and the signal line 220 are preferably not superimposed on each other.

The grid metal layer 211 is a single-layer film including one of light-blocking conductive materials, for example, aluminum (Al), molybdenum (Mo), titanium (Ti), tungsten (W), and chromium (Cr), or a laminated film including two or more of the materials. In the first embodiment, at least a portion of the grid metal layer 211 is located at a periphery of the photoelectric conversion device 21 and in a layer between the p-type semiconductor layer 215B and the substrate 210. In detail, the grid metal layer 211 is provided in a layer between the substrate 210 and the readout control line 213A (Lread, or the gate electrode of the transistor 22).

In such a configuration, the grid metal layer 211 is maintained to the same potential as that of the p-type semiconductor layer 215B. Here, for example, the grid metal layer 211 may be connected to the GND line 214B via a contact a3 (FIGS. 4 and 5), and the p-type semiconductor layer 215B may be connected to the GND line 214B via a contact a4 (FIGS. 4 and 6). In other words, in the first embodiment, the grid metal layer 211 and the p-type semiconductor layer 215B are maintained to the ground potential. It is to be noted that although the grid metal layer 211 and the p-type semiconductor layer 215B are connected to the GND line 214B with the two contacts a3 and a4, the layers 211, 215B, and 214B may be connected thereto via one contact.

FIGS. 7A and 7B illustrate layout examples of the grid metal layer 211. As illustrated in FIG. 7A, the grid metal layer 211 may be provided enclosing the individual pixels 20 (isolating the individual pixels 20 from one another). Alternatively, as illustrated in FIG. 7B, the grid metal layer 211 may be provided in a lattice pattern as a whole (provided to have an opening in a region corresponding to each pixel 20). It is to be noted that, in the configuration of FIG. 7B, since the grid metal layer 211 is integrally provided for all the pixels 20, the contact a3 to the GND line 214B may not be individually provided for the pixels 20, and may be provided at one or more places.

Functions and Effects

In the image pickup unit 1 of the first embodiment, when the image-pickup light Lin is incident on the image pickup section 11, the photoelectric conversion device 21 in each pixel 20 converts the image-pickup light Lin to signal charges (performs photoelectric conversion). Here, in the storage node N, voltage varies in correspondence to capacitance of the storage node due to storage of signal charges produced through photoelectric conversion. Specifically, when capacitance of the storage node is represented as Cs, and when the produced signal charge is represented as q, voltage of the storage node N varies (lowers in this case) by q/Cs. The drain of the transistor 22 receives a voltage corresponding to the signal charge in response to such a variation of voltage. In addition, when the transistor 22 is turned on in response to a row scanning signal supplied through the readout control line Lread, signal charges stored in the storage node N (voltage corresponding to the signal charge applied to the drain of the transistor 22) are read out from the pixel 20 to the signal line Lsig.

The read signal charge is input to the column selecting section 17 in the A/D conversion section 14 for each of a plurality of (four in this embodiment) pixel arrays through the signal line Lsig. In the column selecting section 17, each signal charge sent from each signal line Lsig is subjected to Q-V conversion (conversion from signal charge to signal voltage) processing in the charge amplifier circuit 171, and then the signal voltage is subjected to A/D conversion processing to produce the output data Dout in a form of a digital signal. In this way, the output data Dout is sequentially output from the column selecting sections 17, and is then transmitted to the outside (or input to an undepicted internal memory).

Ideally, in the image pickup unit 1, the image-pickup light Lin incident on each pixel 20 is received by the photoelectric conversion device 21 provided in that pixel 20. In reality, however, a part of the image-pickup light Lin incident on a pixel 20 may not be detected (not be subjected to photoelectric conversion) by the photoelectric conversion device 21 of that pixel 20, but may be reflected by components such as a wiring and/or other components within the unit to be formed into stray light. The stray light may leak into another pixel 20 such as an adjacent pixel, leading to occurrence of so-called crosstalk. Such crosstalk may result in a reduction in modulation transfer function (MTF), and a reduction in resolution of a captured image.

In the first embodiment, each pixel 20 has the light-blocking grid metal layer 211 located at a periphery of the photoelectric conversion device 21, which blocks leakage light from adjacent pixels, resulting in suppression of occurrence of crosstalk as described above. As a result, each pixel 20 detects light at higher accuracy, leading to an improvement in resolution of a captured image. Moreover, such a grid metal layer 211 is maintained to a predetermined potential, thereby capacitive coupling is less likely to occur between the grid metal layer 211 and the photoelectric conversion device 21, the electrode, and/or the wiring layer, leading to a reduction in electrical influence of the grid metal layer 211 on each pixel 20.

Moreover, the grid metal layer 211 is provided in opposition to the wiring layer such as the signal line 220 (Lsig), thereby leakage light is blocked without decreasing a light receiving area (aperture ratio of a pixel) of the photoelectric conversion device 21.

Furthermore, as described above, at least a portion of the grid metal layer 211 is located at a periphery of the photoelectric conversion device 21 and in a lower layer than the p-type semiconductor layer 215B of the photoelectric conversion device 21 (in a layer between the p-type semiconductor layer 215B and the substrate 210). This allows formation of the grid metal layer 211 on the substrate 210 before formation of the photoelectric conversion device 21 that is easily degraded at high temperature (for example, 200 degrees Celsius or higher). Consequently, the grid metal layer 211 may be formed at any temperature without limitation, so that a material, which is formed into a film at relatively high temperature, may be used. On the other hand, since laser annealing (at about several thousand degrees Celsius) is performed to form (poly-crystallize) the p-type semiconductor layer 215B, a material having a high melting point is preferably used for the grid metal layer 211.

Moreover, although the grid metal layer 211 is provided between the p-type semiconductor layer 215B and the substrate 210 in the first embodiment, the grid metal layer 211 is maintained to the same potential (for example, at a ground potential) as that of the p-type semiconductor layer 215B in such a configuration. Consequently, capacitive coupling is less likely to occur between the grid metal layer 211 and the p-type semiconductor layer 215B, making it easier to reduce electrical influence on each pixel 20.

As described hereinbefore, in the first embodiment, each pixel 20 has the grid metal layer 211, at least a portion of the grid metal layer is located at the periphery of the photoelectric conversion device 21, and the grid metal layer 211 is maintained to a predetermined potential. This reduces electrical influence of the grid metal layer 211 on each pixel, and reduces light leakage to an adjacent pixel, leading to suppression of crosstalk between the pixels. Consequently, image quality of a captured image is improved.

Moreover, in the first embodiment, the p-type semiconductor layer 215B of the photoelectric conversion device 21 may include low-temperature polysilicon, thereby the p-type semiconductor layer 215B has a low resistivity. This eliminates the necessity of separately providing a metal electrode for extraction of charges (or discharge of charges) in a lower layer than the p-type semiconductor layer 215B, but may reduce a light-blocking property. Consequently, the grid metal layer 211 of the first embodiment is particularly effective in the case where low-temperature polysilicon is used for the photoelectric conversion device 21.

Modifications (Modifications 1 and 2) of the first embodiment are now described. It is to be noted that the same components as those in the first embodiment are designated by the same numerals, and description of them is appropriately omitted.

Modification 1

Figure 8:
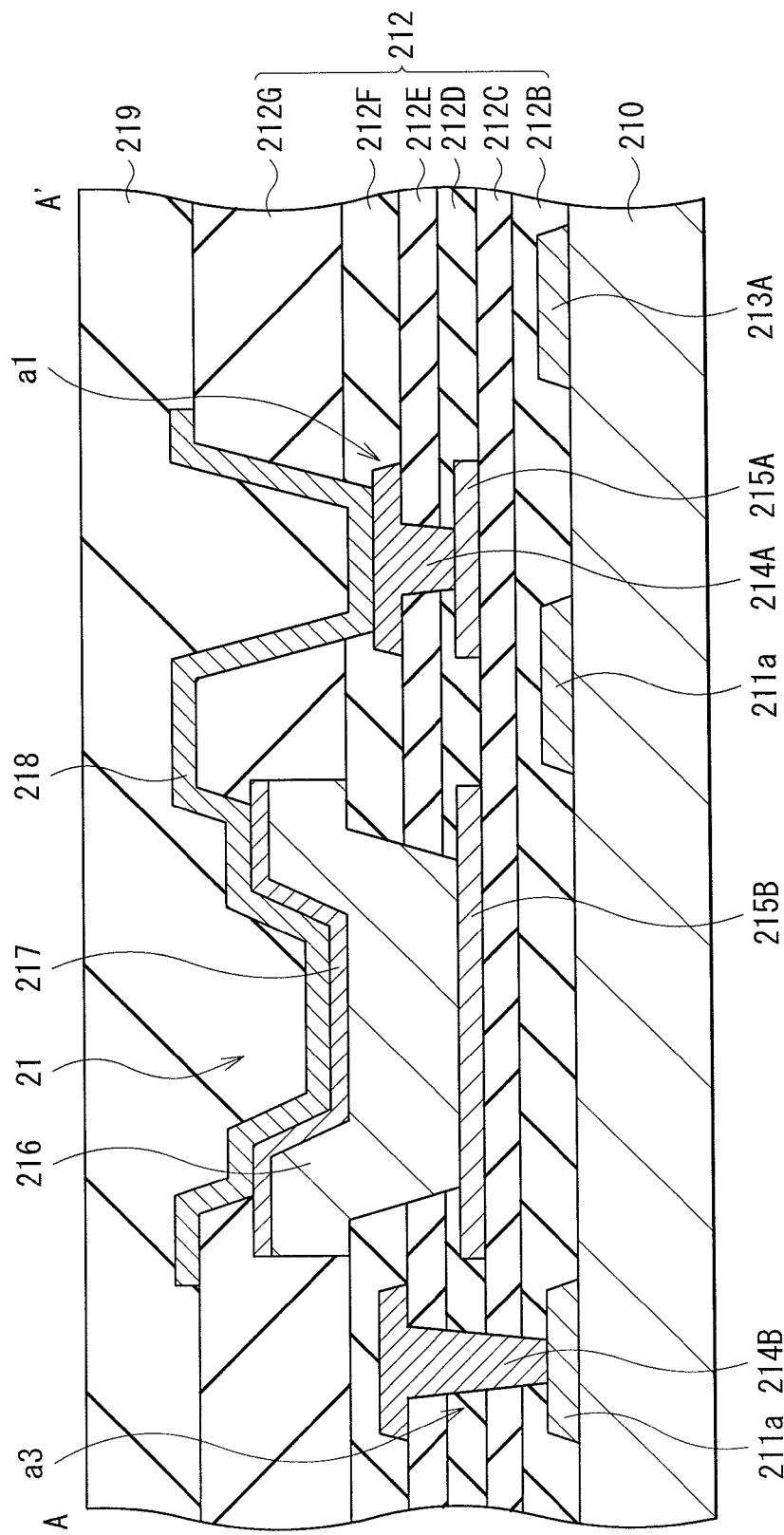
FIG. 8 is a sectional view of a pixel according to Modification 1.

FIG. 8 illustrates a sectional structure of a pixel according to Modification 1. Although the grid metal layer 211 is provided at the location that is in the lower layer than the p-type semiconductor layer 215B and in the layer between the readout control line 213A and the substrate 210 in the first embodiment, the grid metal layer (grid metal layer 211a) may be provided in the same layer as that of the readout control line 213A as in the Modification 1. It is to be noted that, as with the grid metal layer 211 according to the first embodiment described above, the grid metal layer 211a is disposed in opposition to a wiring layer including the signal line 220 (Lsig), etc., at a periphery of the photoelectric conversion device 21, and is connected to the GND line 214B via the contact a3 and is thus maintained to the same potential (ground potential) as that of the p-type semiconductor layer 215B. The planar layout configuration of the grid metal layer 211a is also similar to that of the grid metal layer 211.

In this way, the grid metal layer 211a may be provided in the same layer as that of the readout control line Lread. In such a case, the same advantageous effects as those in the first embodiment are also provided. Moreover, in the Modification 1, the grid metal layer 211a may be formed of the same material as that of the readout control line 213A, for example, molybdenum, and may be collectively formed in the same patterning step as that for the readout control line 213A. In addition, the interlayer insulating film 212A is unnecessary in the Modification 1. Hence, for example, in the case where radiation rays are incident through the substrate 210, the number of layers and the distance (thickness) from the light incidence surface (the back of the substrate 210) to the photoelectric conversion device 21 are reduced, and thus loss of light is reduced.

Modification 2

Figure 9:
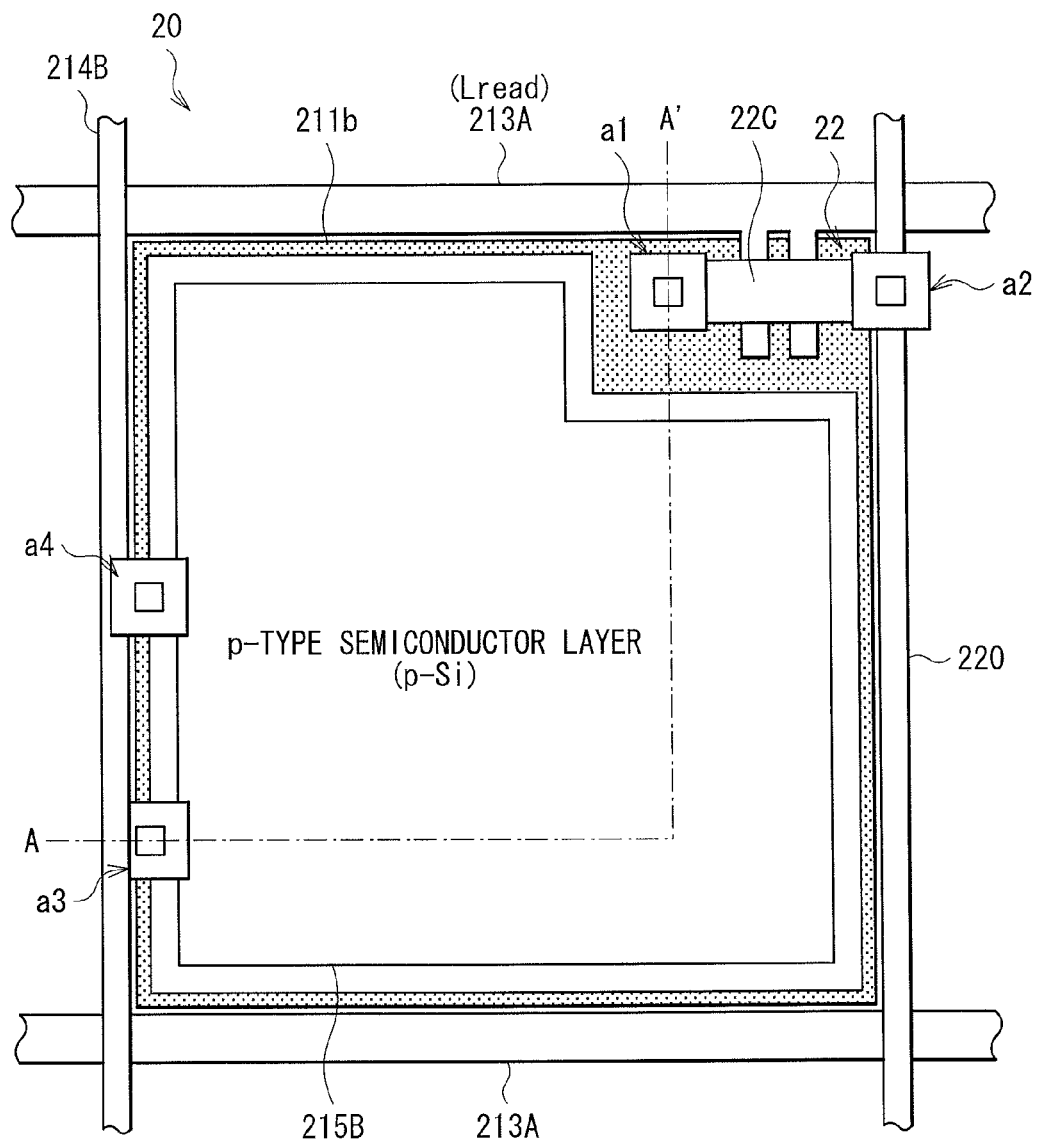
FIG. 9 is a schematic view illustrating an exemplary planar configuration of a relevant part of a pixel according to Modification 2.
Figure 10:
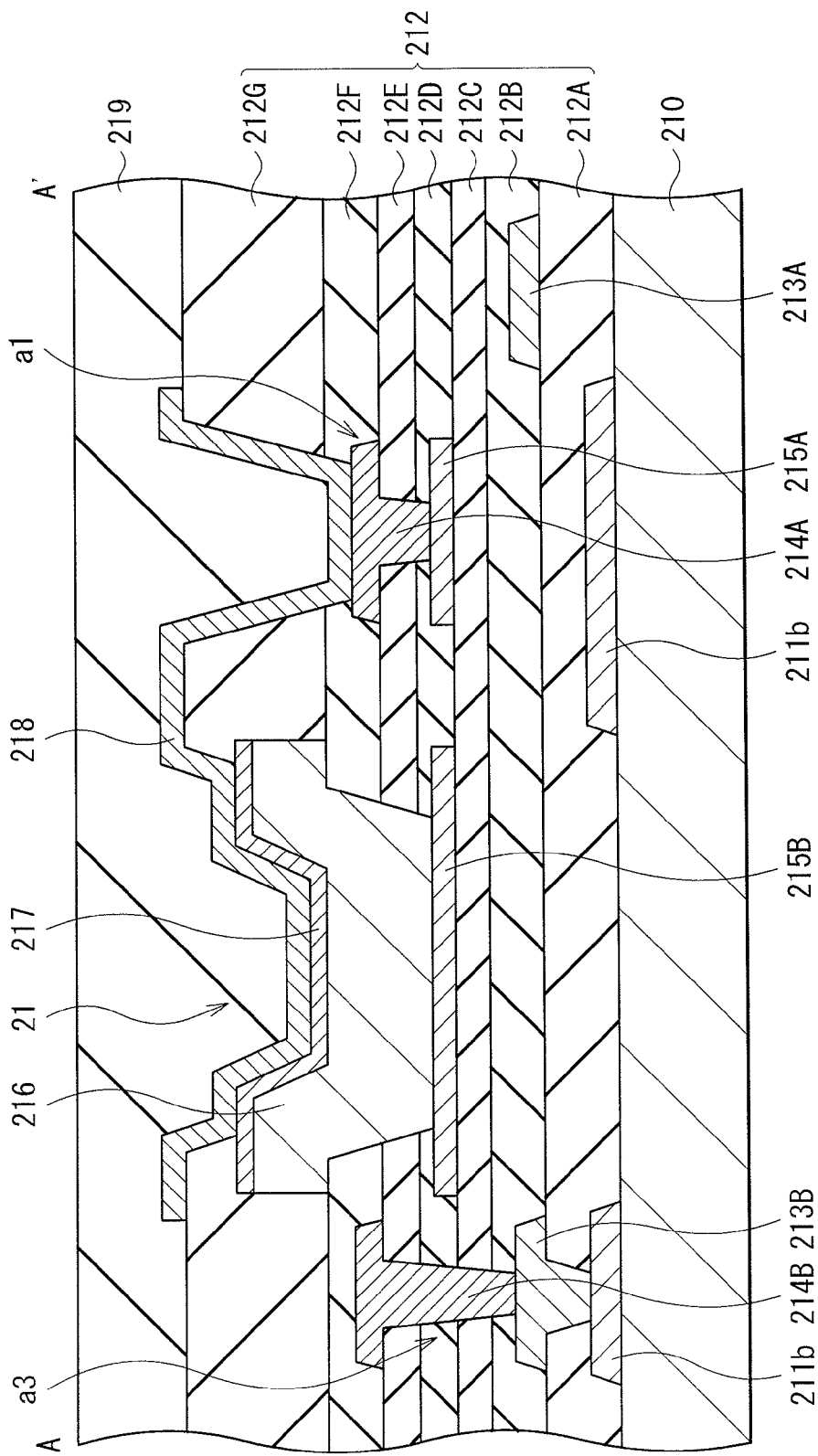
FIG. 10 is a sectional view of a region corresponding to a line A-A' of the pixel illustrated in FIG. 9.

FIG. 9 illustrates a planar configuration of a relevant part of a pixel according to Modification 2. FIG. 10 illustrates a sectional configuration along a line A-A' in FIG. 9. Although the grid metal layer 211 is provided along the surface shape of the photoelectric conversion device 21 (the p-type semiconductor layer 215B), but is not provided in a region opposed to the transistor 22 in the first embodiment, the grid metal layer 211b may also be provided over the region opposed to the transistor 22 as in the Modification 2.

In this way, the grid metal layer 211b may be provided not only over the region opposed to the wiring layer including the signal line 220, etc., but also over the region opposed to the transistor 22. In such a case, the same advantageous effects as those in the first embodiment are also provided.

Second Embodiment

Figure 11:
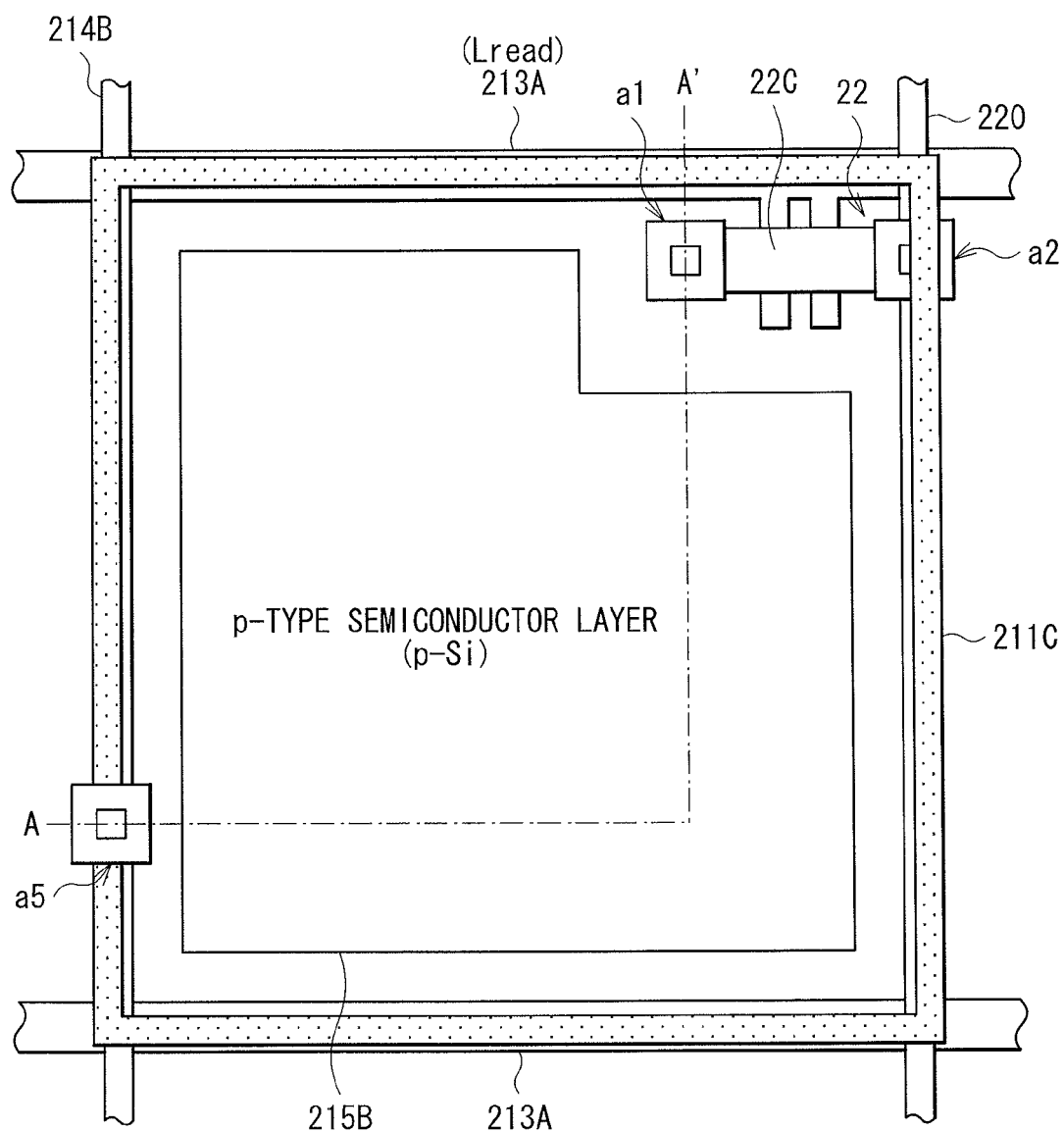
FIG. 11 is a schematic view illustrating an exemplary planar configuration of a pixel in an image pickup unit according to a second embodiment of the disclosure.
Figure 12:
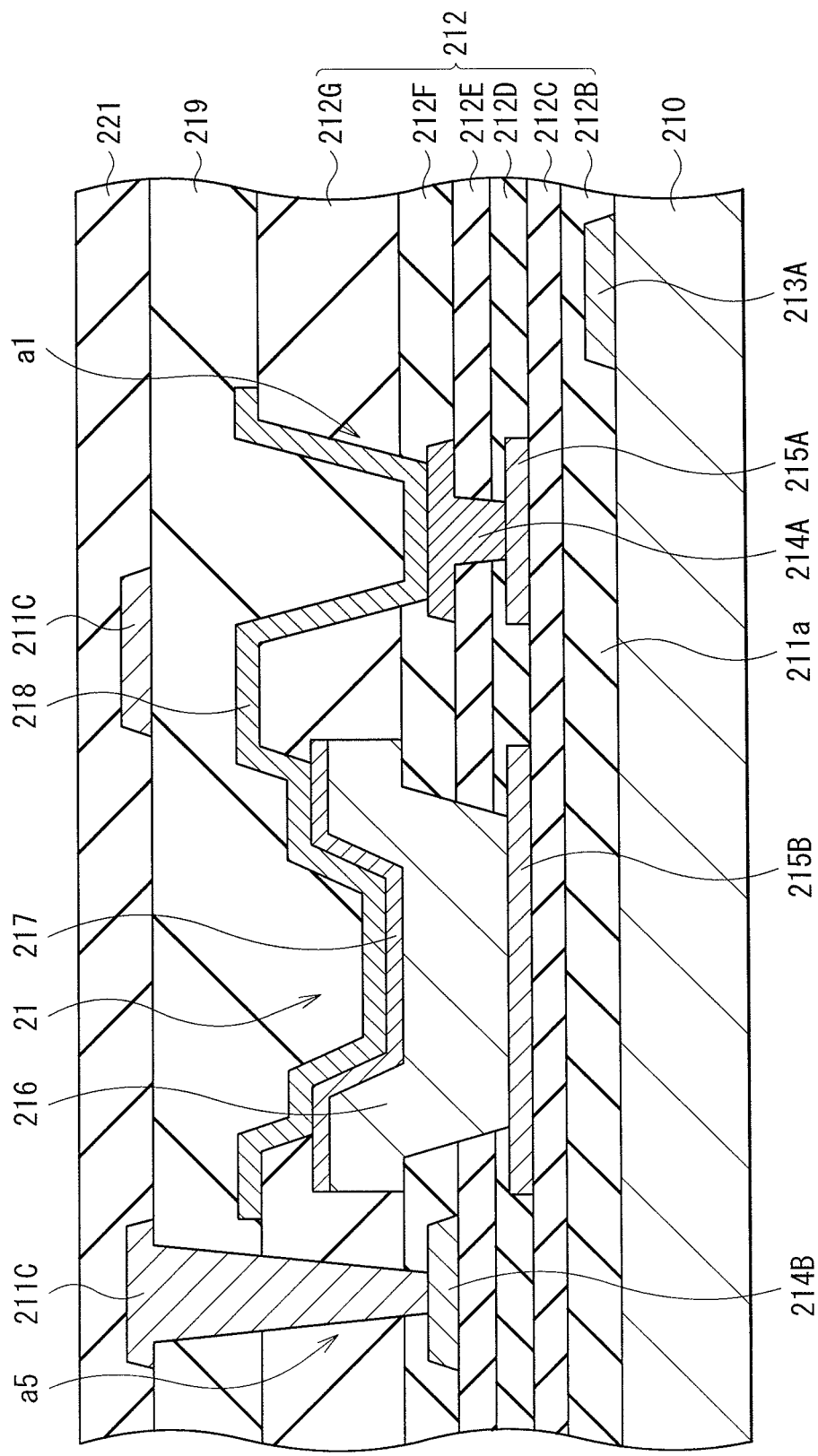
FIG. 12 is a sectional view of a region corresponding to a line A-A' of the pixel illustrated in FIG. 11.

FIG. 11 illustrates a planar configuration of a relevant part of each pixel of an image pickup unit according to a second embodiment of the disclosure. FIG. 12 illustrates a sectional configuration along a line A-A' in FIG. 11. In the second embodiment, a plurality of pixels are provided in the image pickup section 11 and each pixel includes one photoelectric conversion device 21 and one transistor 22, as the pixels 20 in the first embodiment. In addition, at least a portion of a grid metal layer 211c is provided in opposition to the wiring layer at a periphery of the photoelectric conversion device 21.

In the second embodiment, however, at least a portion of the grid metal layer 211c is provided in an upper layer than the photoelectric conversion device 21 (in an upper layer than the n-type semiconductor layer 217) at a periphery of the photoelectric conversion device 21. For example, the grid metal layer 211c may be provided on the protective layer 219 in opposition to the signal line 220 (Lsig), the readout control line 213A (Lread), and the GND line 214B. Although the constitutional materials of the grid metal layer 211c may include materials similar to those of the grid metal layer 211 in the first embodiment, a material, which is successively formed at a temperature as low as possible (for example, about 200 degrees Celsius or lower), is preferably used since the grid metal layer 211c is formed after formation of the photoelectric conversion device 21.

The grid metal layer 211c has a light-blocking property, and is maintained to a predetermined potential. In the second embodiment, the grid metal layer 211c is maintained to a potential that reduces capacitive coupling occurring between the grid metal layer 211c and the wiring layer including the signal line 220 (Lsig) and the readout control line 213A (Lread). Specifically, the grid metal layer 211c is connected to the GND line 214B at the contact a5 so as to be maintained to the ground potential. Alternatively, the grid metal layer 211c may be maintained to a potential set in response to a voltage pulse applied to each of the signal line 220 (Lsig) and the readout control line 213A (Lread) (the potential may be switched at a predetermined timing).

In the second embodiment, when the image-pickup light Lin is incident on the image pickup section 11, signal charges are accumulated in each pixel, and the accumulated signal charges are read out from the pixel 20 to the signal line Lsig with the transistor 22. Each pixel has at least a portion of the grid metal layer 211c with a light-blocking property located at a periphery of the photoelectric conversion device 21, which suppresses crosstalk with an adjacent pixel. In addition, such a grid metal layer 211c is maintained to a predetermined potential as described above, thereby capacitive coupling is less likely to occur particularly between the grid metal layer 211c and the wiring layer including the signal line 220 (Lsig) and the readout control line 213A (Lread), leading to a reduction in electrical influence of the grid metal layer 211c on each pixel 20. Consequently, the same advantageous effects as those in the first embodiment are provided.

Furthermore, at least a portion of the grid metal layer 211c is located at a periphery of the photoelectric conversion device 21 and in the upper layer than the n-type semiconductor layer 217 (on the protective layer 219) of the photoelectric conversion device 21 as described above. Consequently, for example, this makes it easier to reduce crosstalk when the image-pickup light Lin is incident through the protective layer 219.

Modification 3

Figure 13:
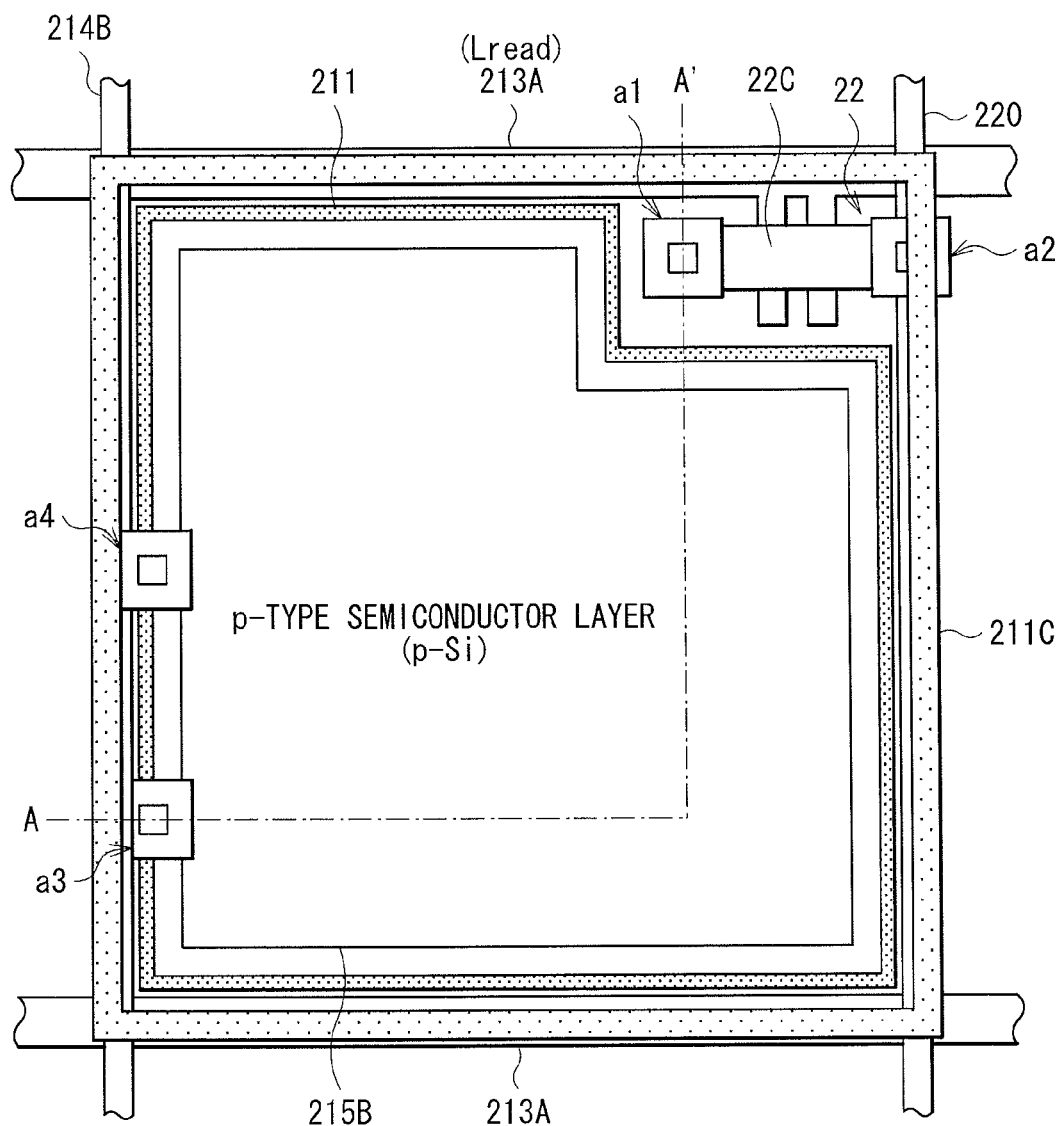
FIG. 13 is a schematic view illustrating an exemplary planar configuration of a relevant part of a pixel according to Modification 3.
Figure 14:
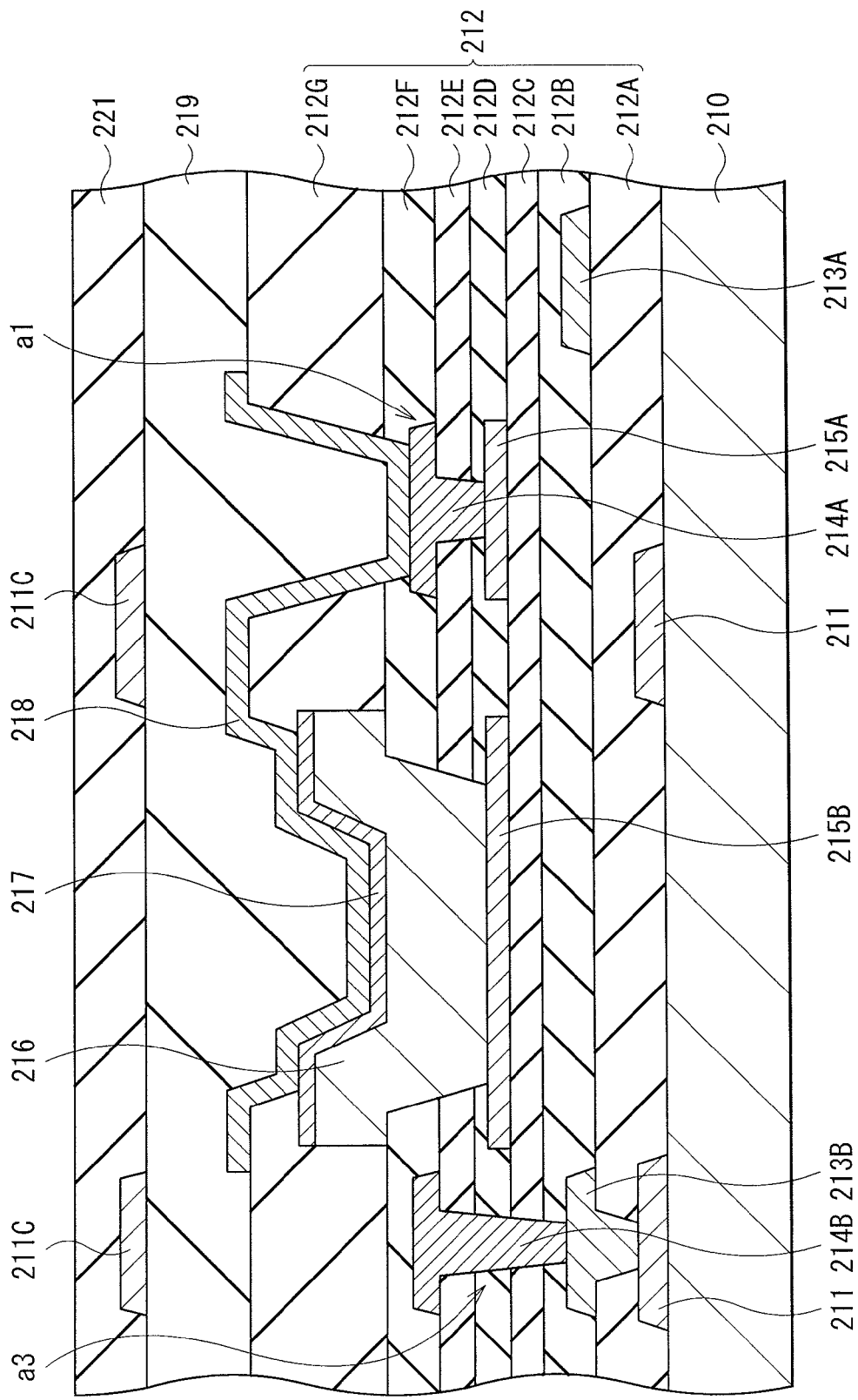
FIG. 14 is a sectional view of a region corresponding to a line A-A' of the pixel illustrated in FIG. 13.

FIG. 13 illustrates a planar configuration of a relevant part of a pixel according to Modification 3 of the above-described embodiments of the disclosure. FIG. 14 illustrates a sectional configuration along a line A-A' in FIG. 13. It is to be noted that although FIG. 14 illustrates each side of the grid metal layer 211 to be parallel to the signal line 220 or the readout control line 213A, the grid metal layer 211 and the wiring layer are actually disposed to be opposed to (superimposed on) each other. As in the Modification 3, the grid metal layer 211 in the first embodiment and the grid metal layer 211c in the second embodiment may be used in combination. The grid metal layer 211 is connected to the GND line 214B, and is maintained to the same ground potential as that of the p-type semiconductor layer 215B. On the other hand, the grid metal layer 211c may be connected to the GND line via an undepicted contact, or may be maintained to a predetermined potential corresponding to a voltage pulse applied to each of the signal line 220 and the readout control line 213A as described above.

In such a case, each of the grid metal layers 211 and 211c is also maintained to a predetermined potential as described above, thereby crosstalk between the pixels is suppressed while electrical influence of the grid metal layer on each pixel is reduced. Moreover, the grid metal layers 211 and 211c are provided in an upper layer and a lower layer than the photoelectric conversion device 21, respectively, which improves the light-blocking property, and is thus advantageous for suppression of crosstalk.

It is to be note that, in the pixel structure of the second embodiment, the grid metal layer 211c may be also provided over a region opposed to the transistor 22 as in the Modification 2. Moreover, in the pixel structure of the Modification 3, one or both of the grid metal layers 211 and 211c may be also provided over a region opposed to the transistor 22 as in the Modification 2. Moreover, in the pixel structure of the Modification 3, the grid metal layer 211 may be provided in the same layer as that of the readout control line 213A as in the Modification 1.

Modification 4-1

Figure 15:
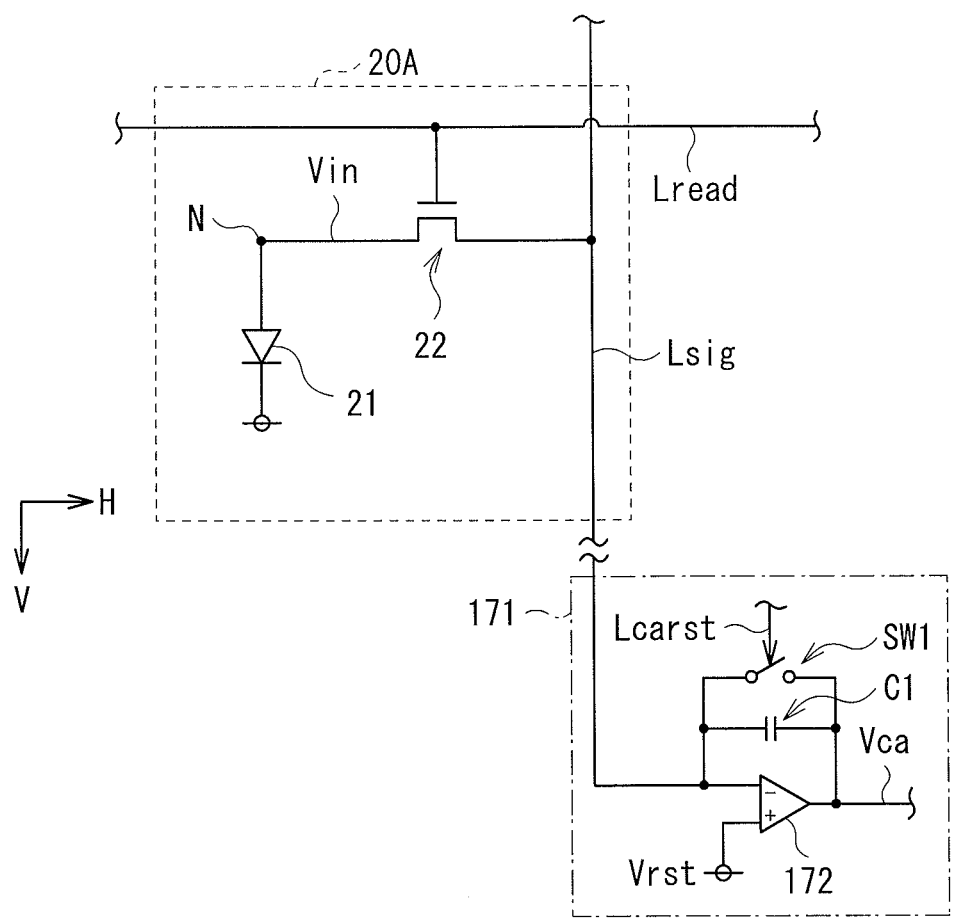
FIG. 15 is a circuit diagram illustrating a configuration including a pixel and other components according to Modification 4-1.

FIG. 15 illustrates a circuit configuration of a pixel (pixel 20A) according to Modification 4-1 together with an exemplary circuit configuration of a charge amplifier circuit 171. As in the pixel 20 of the above-described respective embodiments, the pixel 20A has a passive circuit configuration, and includes one photoelectric conversion device 21 and one transistor 22. In addition, the pixel 20A is connected to the readout control line Lread and the signal Lsig.

The pixel 20A of the Modification 4-1, however, is different from the pixel 20 of each of the embodiments described above in that the anode of the photoelectric conversion device 21 is connected to the storage node N, and the cathode thereof is connected to a power source. In this way, the anode of the photoelectric conversion device 21 may be connected to the storage node N in the pixel 20A. In such a case, the same advantageous effects as those of the image pickup unit 1 of each of the embodiments described above are also provided.

Modification 4-2

Figure 16:
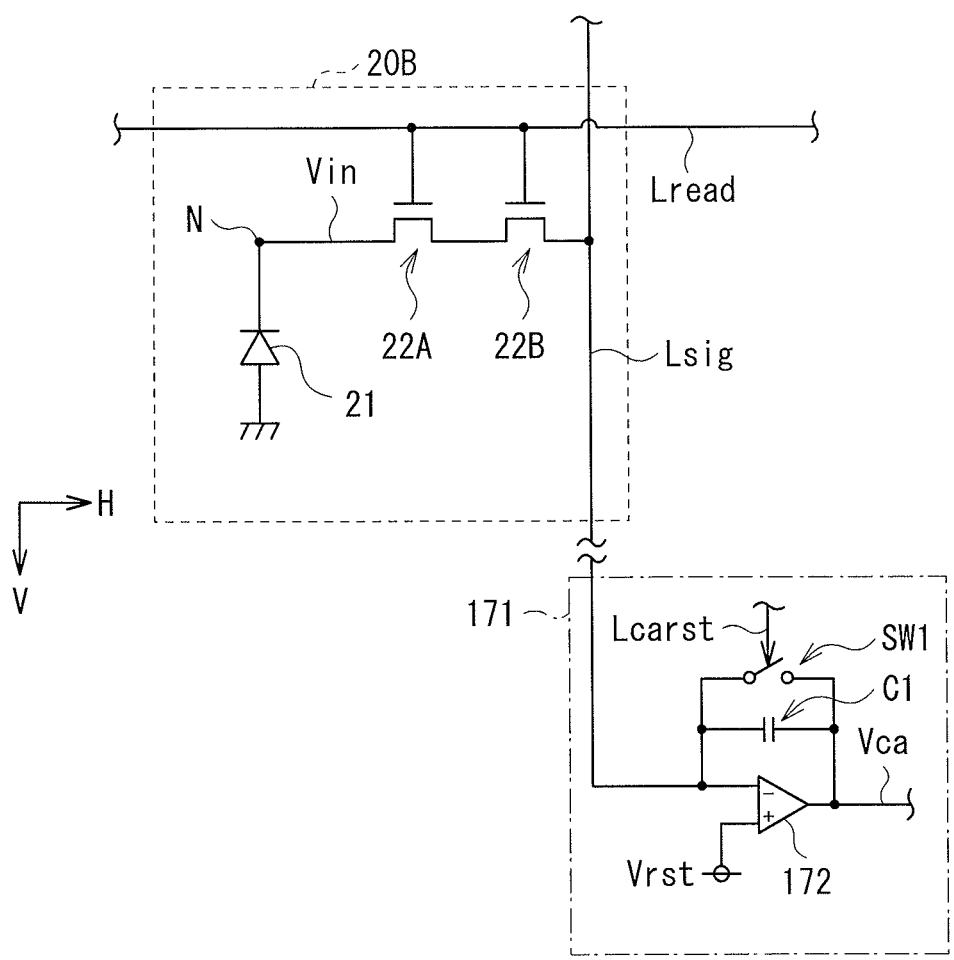
FIG. 16 is a circuit diagram illustrating a configuration including a pixel and other components according to Modification 4-2.

FIG. 16 illustrates a circuit configuration of a pixel (pixel 20B) according to Modification 4-2 together with an exemplary circuit configuration of a charge amplifier circuit 171. As in the pixel 20 of the above-described respective embodiments, the pixel 20B has a passive circuit configuration, and is connected to the readout control line Lread and the signal Lsig.

The pixel 20B of the Modification 4-2, however, includes one photoelectric conversion device 21 and two transistors 22A and 22B. The two transistors 22A and 22B are connected in series to each other (a source or drain of one transistor is electrically connected to a drain or source of the other transistor). The gate of each of the transistors 22A and 22B is connected to the readout control line Lread.

In this way, the two transistors 22A and 22B connected in series may be provided in the pixel 20B. In such a case, the same advantageous effects as those in the embodiments described above are also provided.

Modifications 4-3 and 4-4

Figure 17:
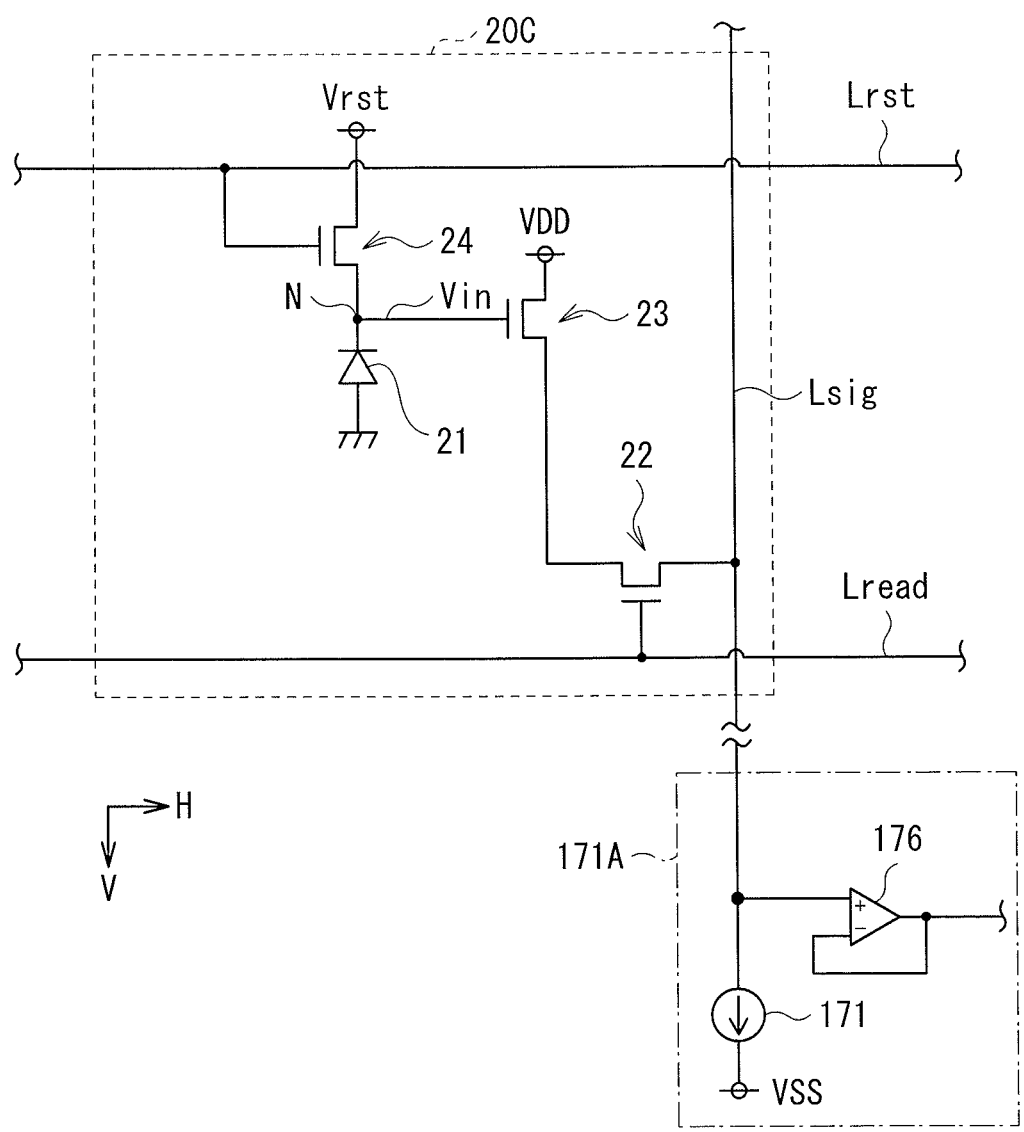
FIG. 17 is a circuit diagram illustrating a configuration including a pixel and other components according to Modification 4-3.
Figure 18:
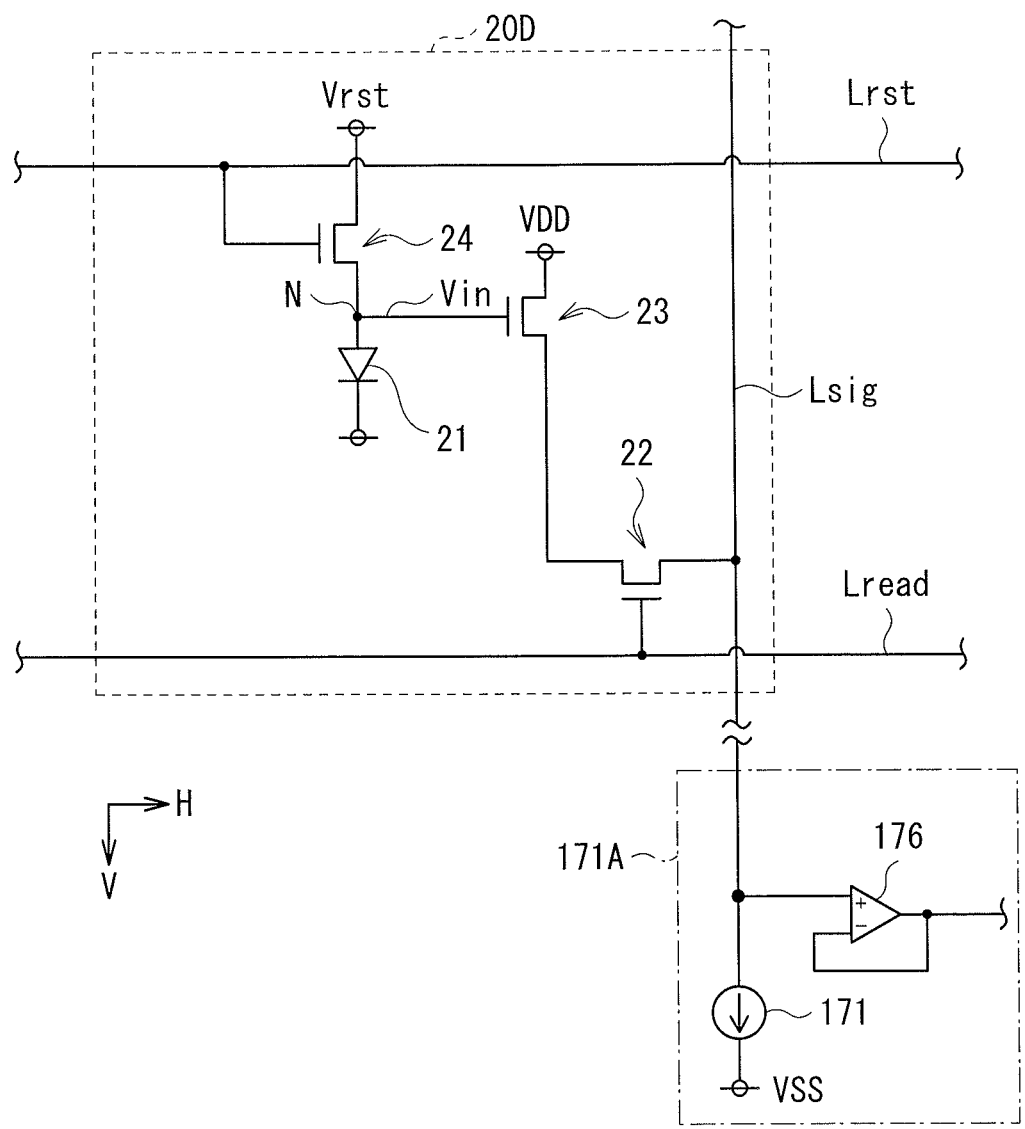
FIG. 18 is a circuit diagram illustrating a configuration including a pixel and other components according to Modification 4-4.

FIG. 17 illustrates a circuit configuration of a pixel (pixel 20C) according to Modification 4-3 together with an exemplary circuit configuration of an amplifier circuit 171A. FIG. 18 illustrates a circuit configuration of a pixel (pixel 20D) according to Modification 4-4 together with an exemplary circuit configuration of an amplifier circuit 171A. The pixels 20C and 20D each have a so-called active circuit configuration unlike the pixels 20, 20A, and 20B described hereinbefore.

The pixels 20C and 20D each include one photoelectric conversion device 21 and three transistors 22, 23, and 24. In addition, each of the pixels 20C and 20D is connected to the readout control line Lread, the signal Lsig, and a reset control line Lrst.

In each of the pixels 20C and 20D, the gate of the transistor 22 is connected to the readout control line Lread, the source thereof may be connected to, for example, the signal Lsig, and the drain thereof may be connected to, for example, the drain of the transistor 23 configuring a source follower circuit. The source of the transistor 23 may be connected to, for example, a power source VDD, and the gate thereof may be connected to, for example, the cathode (FIG. 17) or the anode (FIG. 18) of the photoelectric conversion device 21 and the drain of the transistor 24 serving as a reset transistor via the storage node N. The gate of the transistor 24 is connected to the reset control line Lrst, and the source thereof may receive a reset voltage Vrst, for example. In the Modification 4-3 of FIG. 17, the anode of the photoelectric conversion device 21 is connected to the ground (is grounded). In the Modification 4-4 of FIG. 18, the cathode of the photoelectric conversion device 21 is connected to a power source.

The amplifier circuit 171A is provided in the above-described column selecting section 17, and has a constant current source 171 and an amplifier 176 in place of the charge amplifier 172, the capacitive element C1, and the switch SW1. In the amplifier 176, a positive input terminal is connected to the signal line Lsig, and a negative input terminal and an output terminal are connected to each other, so that a voltage follower circuit is formed. It is to be noted that one terminal of the constant current source 171 is connected to one end of the signal line Lsig, and the other terminal thereof is connected to the power source VSS.

The grid metal layer 211 described in the embodiments and the Modifications described above may also be applied to an image pickup unit having such an active pixel 20C or 20D, thereby allowing suppression of occurrence of shot noise or variations in a dark level. Consequently, the advantageous effects similar to those in the above-described respective embodiments are provided.

Modification 5-1

Figure 19:
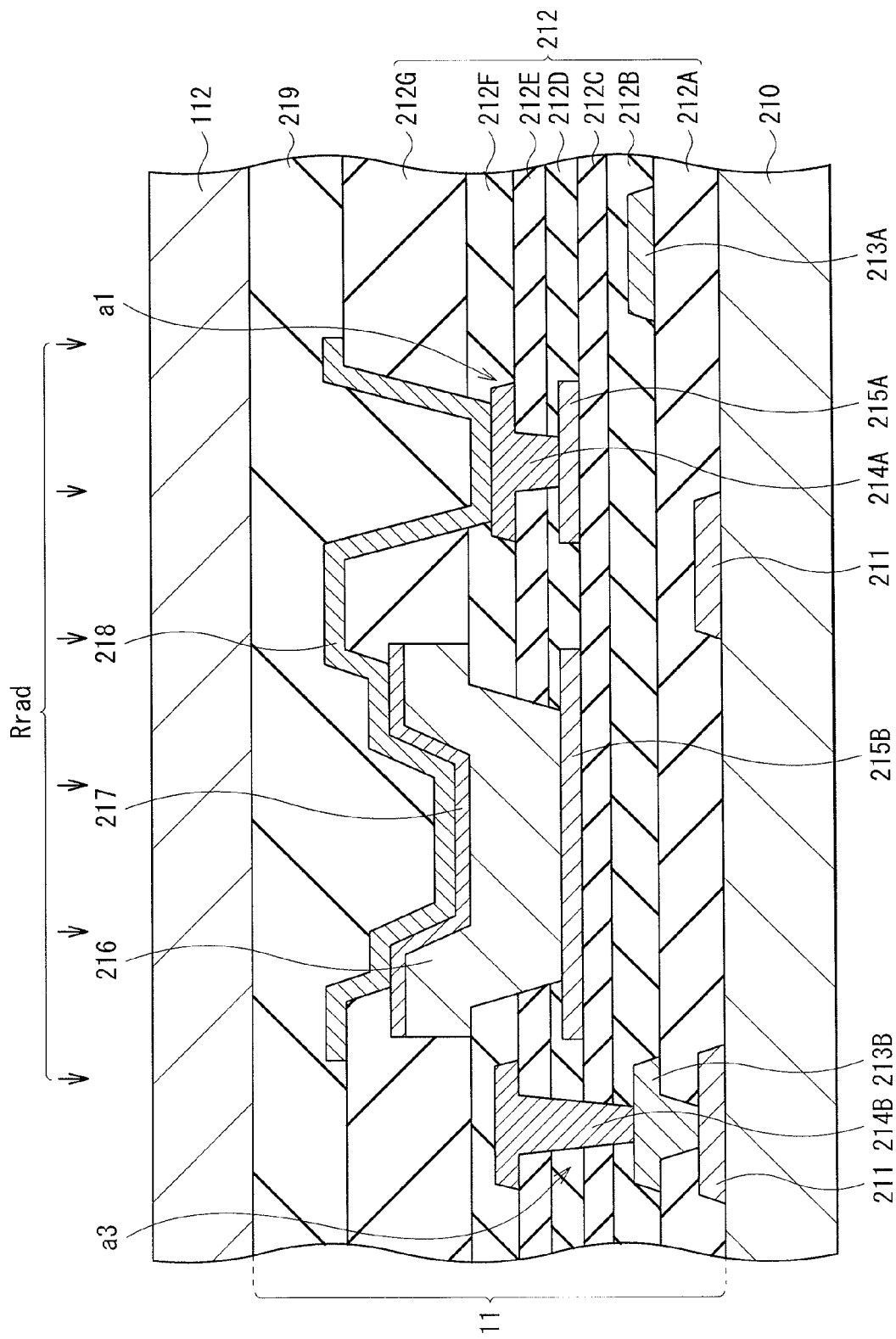
FIG. 19 is a sectional view of a pixel according to Modification 5-1.

FIG. 19 illustrates a sectional configuration of a pixel according to Modification 5-1. In the Modification 5-1, a wavelength conversion layer 112 is further provided on the image pickup section 11 (on the protective layer 219). The wavelength conversion layer 112 converts a wavelength of radiation rays Rrad (such as α-rays, β-rays, γ-rays, and X-rays) into a wavelength in the sensitivity range of the photoelectric conversion device 21, so that the photoelectric conversion device 21 is allowed to read information based on the radiation rays Rrad. The wavelength conversion layer 112 may be formed of, for example, a phosphor (for example, a scintillator) that converts radiation rays such as X-rays to visible light. For example, such a wavelength conversion layer 112 may be produced by forming an organic planarization film or a planarization film including, for example, a spin-on-glass material on the protective layer 219, and then forming a phosphor film (such as a CsI, NaI, or $CaF_2$ film) thereon. Such a pixel structure may be applied to a so-called indirect-conversion radiographic image pickup unit, for example. In such a case, the grid metal layer 211c described in the second embodiment may be preferably provided.

Modification 5-2

Figure 20:
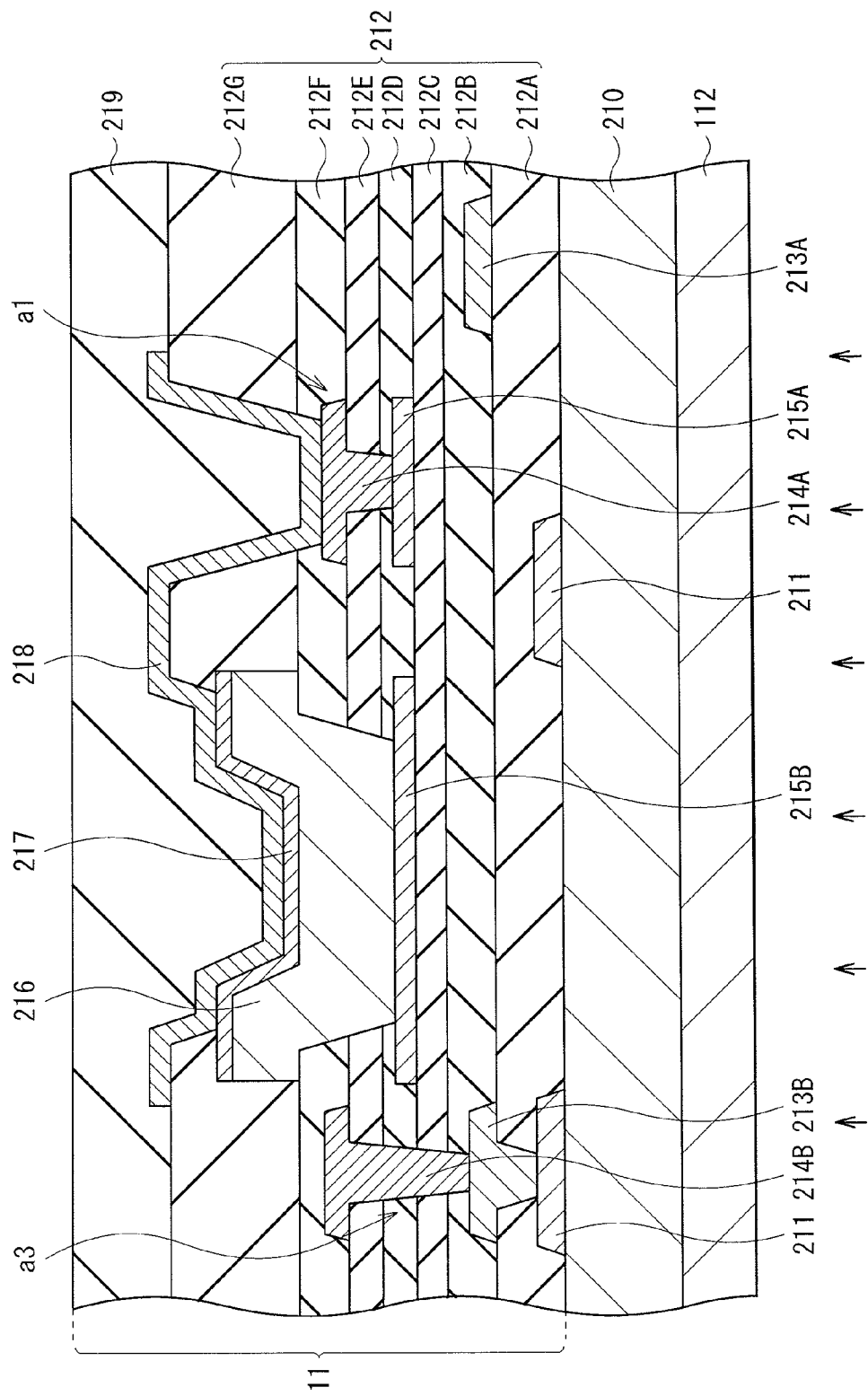
FIG. 20 is a sectional view of a pixel according to Modification 5-2.

FIG. 20 illustrates a sectional configuration of a pixel according to Modification 5-2. In the Modification 5-2, a wavelength conversion layer 112 is provided on the back of the substrate 210, and radiation rays Rrad, which enter through the back of the substrate 21, are subjected to wavelength conversion in the wavelength conversion layer 112, and are then detected by the photoelectric conversion device 21. This pixel structure may also be applied to an indirect-conversion radiographic image pickup unit. In such a case, the grid metal layer 211 described in the first embodiment may be preferably provided. The pixel structure of the Modification 5-2 may be achieved in the case where low-temperature polysilicon is used for the p-type semiconductor layer 215B. If the low-temperature polysilicon is used, a metal electrode may not be separately provided since sufficient conductivity is given as described above, allowing admission of light through the back of the substrate 210. It is to be noted that, in the case where light is admitted through the back of the substrate 210, a transparent substrate such as glass may be used for the substrate 210.

Modification 5-3

Figure 21:
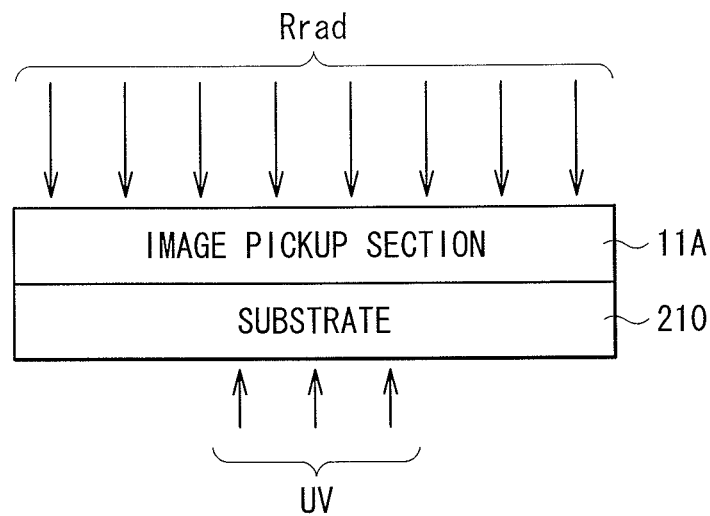
FIG. 21 is a schematic view of an image pickup section according to Modification 5-3.

FIG. 21 schematically illustrates a rough configuration of an image pickup section (image pickup section 11A) according to Modification 5-3. The image pickup section 11A includes a photoelectric conversion device that converts received radiation rays Rrad to an electric signal unlike the image pickup section in the embodiments and the Modifications described hereinbefore. Such a photoelectric conversion device may be formed of, for example, amorphous selenium (a-Se) semiconductor, cadmium tellurium (CdTe) semiconductor, or the like. Such a structure may be applied to a so-called direct-conversion radiographic image pickup unit, for example. In the direct-conversion radiographic image pickup unit, for example, ultraviolet (UV) rays or the like may be applied as refresh light (light for removing residue charges that may be produced in the semiconductor forming a direct-conversion film) for the photoelectric conversion device. Use of the grid metal layer 211 in such a direct-conversion radiographic image pickup unit allows the refresh light to be efficiently admitted from a side opposite to a side from which the radiation rays Rrad are incident.

An image pickup unit including the pixel structure or the image pickup section according to any of the above-described Modifications 5-1 to 5-3 is used as any of various radiographic image pickup units that each acquire electric signals based on received radiation rays Rrad. Possible applications of such radiographic image pickup units include, without limitation, a medical X-ray image pickup unit (such as a digital radiography), a portable-object inspection X-ray image pickup unit in use at airports and other places, and an industrial X-ray image pickup unit (such as an unit for inspection of dangerous objects in bulk containers and an unit for inspection of objects in bags).

Application Example

The image pickup unit according to each of the above-described embodiments and Modifications may be applied to an image pickup display system as described below.

Figure 22:
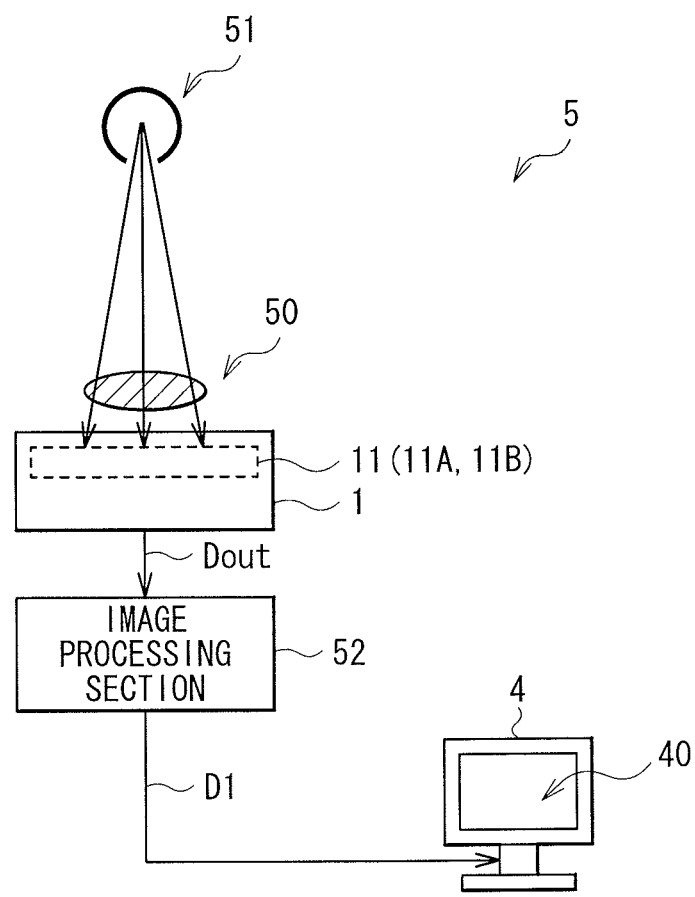
FIG. 22 is a schematic view illustrating a schematic configuration of an image pickup display system according to an application example.

FIG. 22 schematically illustrates a rough configuration of an image pickup display system (image pickup display system 5) according to an application example. The image pickup display system 5 includes: the image pickup unit 1 including the above-described image pickup section 11 (or image pickup section 11A); an image processing section 52; and a display unit 4. In this example, the image pickup display system 5 is an image pickup display system (a radiographic image pickup display system) that uses radiation rays.

The image processing section 52 performs predetermined image processing to output data Dout (an image pickup signal) output from the image pickup unit 1 to produce image data D1. The display unit 4 performs image display based on the image data D1 produced by the image processing section 52 on a predetermined monitor screen 40.

In the image pickup display system 5, the image pickup unit 1 (a radiographic image pickup unit in this example) acquires image data Dout of a subject 50 based on irradiation light (radiation rays in this example) applied from a light source (a radiation source such as an X-ray source in this example) 51 to the subject 50, and output the image data Dout to the image processing section 52. The image processing section 52 performs the predetermined image processing to the received image data Dout, and outputs the image data (display data) D1 subjected to the image processing to the display unit 4. The display unit 4 displays image information (a captured image) on the monitor screen 40 based on the received image data D1.

In this way, in the image pickup display system 5 of the application example, the image pickup unit 1 may acquire an image of the subject 50 in a form of an electric signal, allowing image display through transmission of the acquired electric signal to the display unit 4. In other words, the image pickup display system 5 allows observation of an image of the subject 50 without any radiographic film unlike in the past, and is ready for moving-image photography and moving-image display.

It is to be noted that although the application example has been described with an exemplary case where the image pickup unit 1 is configured as a radiographic image pickup unit to provide an image pickup display system using radiation rays, the image pickup display system according to one embodiment of the disclosure may be applied to an image pickup display system including any other type of image pickup unit.

Although the disclosure has been described with the embodiments, the modifications, and the application example hereinbefore, the content of the disclosure is not limited thereto, and various modifications or alterations thereof may be made. For example, although the embodiments, the modifications, and the application example have been described with an exemplary configuration where at least a portion of the grid metal layer is provided enclosing (in a lattice pattern or a frame pattern) the photoelectric conversion device 21 at a periphery of the photoelectric conversion device 21, the grid metal layer may not be necessarily provided without disconnection at the periphery of the photoelectric conversion device 21. In other words, the grid metal layer may be partially disconnected, or may be disposed in a stripe pattern along one of the signal line Lsig and the readout control line Lread. The grid metal layer, however, is preferably provided enclosing the photoelectric conversion device 21 along a surface shape of the photoelectric conversion device 21 as described above in light of suppression of leakage light.

Moreover, the circuit configuration of the pixel in the image pickup section is not limited to those described in the embodiments, the modifications, and the application example (the circuit configurations of the pixels 20, and 20A to 20D), and the pixel may have another circuit configuration. Similarly, the circuit configuration of each of the row scanning section, the column scanning section, and other sections is not limited to those described in the embodiments, the modifications, and the application example, and each section may have another circuit configuration.

Furthermore, the image pickup section, the row scanning section, the A/D conversion section (the column selecting section), the column scanning section, and other sections described in the embodiments, the modifications, and the application example may be provided on the same substrate, for example. Specifically, for example, use of polycrystalline semiconductor such as low-temperature polycrystalline silicon enables switches, etc., in such circuit portions to be formed on the same substrate. For example, this allows drive operation of the sections on the same substrate based on a control signal from an external system control section, achieving small bezel size (a bezel structure with three free sides), and an improvement in reliability during wiring connection.

Furthermore, the technology encompasses any possible combination of some or all of the various embodiments and the modifications described herein and incorporated herein.

It is possible to achieve at least the following configurations from the above-described example embodiments, the modifications, and the application example of the disclosure.

(1) An image pickup section with at least one pixel comprising (a) a photoelectric conversion device configured to receive incident light and generate an electric charge corresponding the incident light, and (b) at least a portion of the light blocking layer located at an outside the periphery of the photoelectric conversion device.

(2) The image pickup section according to (1), wherein the pixel is connected to a read out control line and a signal line.

(3) The image pickup section according to (2), wherein the light blocking layer is opposite of the read out control line.

(4) The image pickup section according to (1) wherein light blocking layer is provided in the same layer as the read out control line.

(5) The image pickup section according to (4) wherein the light blocking layer and the read out control line are the same material.

(6) The image pickup section according to (1) wherein the photoelectric conversion device is configured to receive incident light and generate an electric charge corresponding to the incident light.

(7) The image pickup section according to (1) wherein a portion of the light blocking layer overlaps with a portion of the photoelectric conversion device.

(8) The image pickup section according to (1) wherein the light-blocking layer has a predetermined electric potential.

(9) The image pickup section according to (1) wherein the photoelectric conversion device comprises a first type semiconductor layer, an intrinsic semiconductor layer, and a second type semiconductor layer.

(10) The image pickup section according to (9) wherein the light-blocking layer and the first type semiconductor layer are connected to a predetermined electric potential.

(11) The image pickup section according to (1) wherein the light-blocking layer is in-between a gate electrode and a substrate.

(12) The image pickup section according to (1) wherein the light-blocking layer is provided on the same layer as a gate electrode.

(13) The image pickup section according to (9) wherein the first type semiconductor comprises a low temperature poly-silicon.

(14) The image pickup section according to (1) wherein the photoelectric conversion device converts x-ray incident light into electric charges.

(15) An image pickup unit comprising:
an image pickup section;
a row scanning section;
a column scanning section; and
a system control section configured to control the row scanning section and the column scanning section,
wherein,
the image pickup section comprises (a) a plurality of pixels arranged in a matrix, (b) for each pixel, a photoelectric conversion device configured to receive incident light and generate an electric charge corresponding the incident light, and (c) for each pixel, at least a portion of a light blocking layer located at outside the periphery of the photoelectric conversion device, the light blocking layer located above the photoelectric conversion device.

(16) The image pickup unit according to (15) wherein the a photoelectric conversion device is configured to receive incident light and generate an electric charge corresponding the incident light.

(17) The image pickup unit according to (15) wherein the image pickup section further comprises a wavelength conversion layer configured to convert a wavelength of a radiation ray into a wavelength in a sensitivity range of the photoelectric conversion device.

(18) The image pickup unit according to (17) wherein the wavelength conversion layer is configured to convert an X-ray wavelength into a sensitivity range of the photoelectric conversion device.

(19) An image pickup display system comprising:
an image pickup unit;
an image processing section, and
a display unit,
wherein,
the image pickup unit comprises (a) an image pickup section, (b) a row scanning section; (c) a column scanning section, and (d) a system control section configured to control the row scanning section and the column scanning section, and
the image pickup section comprises (a) a plurality of pixels arranged in a matrix, (b) for each pixel, a photoelectric conversion device configured to receive incident light and generate an electric charge corresponding the incident light, and (c) for each pixel, a light blocking layer outside the periphery of the photoelectric conversion device.

(20) An image pickup unit, including:
a plurality of pixels each including a photoelectric conversion device and a field-effect transistor, wherein each of the pixels includes a light-blocking layer in a peripheral region of the photoelectric conversion device, the light-blocking layer being maintained to a predetermined electric potential.

(21) The image pickup unit according to (20), wherein
the peripheral region includes a wiring layer, the wiring layer including a signal line and a readout control line, and
the light-blocking layer is disposed in opposition to the wiring layer.

(22) The image pickup unit according to (21), wherein
the photoelectric conversion device is provided on a substrate, and includes, in order from the substrate, a first-conductivity-type semiconductor layer, an intrinsic semiconductor layer, and a second-conductivity-type semiconductor layer, and
the light-blocking layer is provided between the first-conductivity-type semiconductor layer and the substrate in the peripheral region of the photoelectric conversion device, and is maintained to an electric potential that is substantially the same as an electric potential of the first-conductivity-type semiconductor layer.

(23) The image pickup unit according to (22), wherein the light-blocking layer and the first-conductivity-type semiconductor layer are maintained to a predetermined DC electric potential.

(24) The image pickup unit according to (22) or (23), wherein the light-blocking layer is provided between a gate electrode of the transistor and the substrate.

(25) The image pickup unit according to (22) or (23), wherein the light-blocking layer is provided in a same layer as a gate electrode of the transistor.

(26) The image pickup unit according to any one of (22) to (25), wherein the first-conductivity-type semiconductor layer includes low-temperature polysilicon.

(27) The image pickup unit according to (21), wherein the light-blocking layer is provided over a region in opposition to each of the wiring layer and the transistor.

(28) The image pickup unit according to (21), wherein
the photoelectric conversion device is provided on a substrate, and includes, in order from the substrate, a first-conductivity-type semiconductor layer, an intrinsic semiconductor layer, and a second-conductivity-type semiconductor layer, and
the light-blocking layer is provided in an upper layer than the second-conductivity-type semiconductor layer in the peripheral region of the photoelectric conversion device, and is maintained to a ground potential.

(29) The image pickup unit according to (21), wherein
the photoelectric conversion device is provided on a substrate, and includes, in order from the substrate, a first-conductivity-type semiconductor layer, an intrinsic semiconductor layer, and a second-conductivity-type semiconductor layer, and
the light-blocking layer is provided in an upper layer than the second-conductivity-type semiconductor layer in the peripheral region of the photoelectric conversion device, and is maintained to an electric potential set in response to a voltage pulse applied to each of a scan line and the signal line.

(30) The image pickup unit according to (21), wherein
the photoelectric conversion device is provided on a substrate, and includes, in order from the substrate, a first-conductivity-type semiconductor layer, an intrinsic semiconductor layer, and a second-conductivity-type semiconductor layer, and
the light-blocking layer is provided in a layer between the first-conductivity-type semiconductor layer and the substrate in the peripheral region of the photoelectric conversion device, and in an upper layer than the second-conductivity-type semiconductor layer in the peripheral region of the photoelectric conversion device.

(31) The image pickup unit according to any one of (21) to (30), further including a wavelength conversion layer,
wherein the photoelectric conversion device is provided on a substrate, and the wavelength conversion layer is provided on a back of the substrate and converts a wavelength of a radiation ray into a wavelength in a sensitivity range of the photoelectric conversion device.

(32) The image pickup unit according to any one of (21) to (30), further including a wavelength conversion layer,
wherein the photoelectric conversion device is provided on a substrate, and the wavelength conversion layer is provided on the photoelectric conversion device and converts a wavelength of a radiation ray into a wavelength in a sensitivity range of the photoelectric conversion device.

(33) The image pickup unit according to any one of (21) to (30), wherein the photoelectric conversion device generates an electric signal based on an incident radiation ray.

(34) The image pickup unit according to any one of (31) to (33), wherein the radiation ray is an X-ray.

(35) An image pickup display system with an image pickup unit and a display unit that performs image display based on an image pickup signal obtained by the image pickup unit, the image pickup unit including:
a plurality of pixels each including a photoelectric conversion device and a field-effect transistor, wherein
each of the pixels includes a light-blocking layer in a peripheral region of the photoelectric conversion device, the light-blocking layer being maintained to a predetermined electric potential.

What is claimed is:

1. An image pickup section with at least one pixel comprising:
    (a) a photoelectric conversion device including a first conductivity type semiconductor layer, an intrinsic semiconductor layer, and a second conductivity type semiconductor layer,
    (b) a peripheral area located outside of the photoelectric conversion device, and
    (c) a light blocking layer within the peripheral area and surrounding the first conductivity type semiconductor layer in plan view.

2. The image pickup section according to claim 1, wherein the at least one pixel is connected to a read out control line and a signal line.

3. The image pickup section according to claim 2, wherein the light blocking layer is not overlaid with the read out control line.

4. The image pickup section according to claim 2, wherein the light blocking layer is provided in the same layer as the read out control line.

5. The image pickup section according to claim 4, wherein the light blocking layer and the read out control line are made of the same material.

6. The image pickup section according to claim 1, wherein the photoelectric conversion device is configured to receive incident light and generate an electric charge corresponding to the incident light.

7. The image pickup section according to claim 1, wherein a portion of the light blocking layer overlaps a portion of the photoelectric conversion device.

8. The image pickup section according to claim 1, wherein the light-blocking layer has a predetermined electric potential.

9. The image pickup section according to claim 1, wherein the light-blocking layer and the first conductivity type semiconductor layer are connected to a predetermined electric potential.

10. The image pickup section according to claim 1, wherein the light-blocking layer is in-between a gate electrode and a substrate.

11. The image pickup section according to claim 1, wherein the light-blocking layer is provided in the same layer as a gate electrode.

12. The image pickup section according to claim 1, wherein the first conductivity type semiconductor comprises a low temperature poly-silicon.

13. The image pickup section according to claim 1, wherein the photoelectric conversion device converts x-ray incident light into electric charges.

14. An image pickup display system comprising:
    an image pickup unit;
    an image processing section; and
    a display unit,
    wherein, the image pickup unit comprises:
    (a) an image pickup section,
    (b) a row scanning section,
    (c) a column scanning section, and
    (d) a system control section configured to control the row scanning section and the column scanning section, and
    wherein the image pickup section comprises:
    (a) a plurality of pixels arranged in a matrix,
    (b) for each pixel, a photoelectric conversion device including a first conductivity type semiconductor layer, an intrinsic semiconductor layer, a second conductivity type semiconductor layer, and a peripheral area located outside of the photoelectric conversion device, and
    (c) for each pixel, a light blocking layer within the peripheral area of the photoelectric conversion device and surrounding the first conductivity type semiconductor layer in plan view.

* * * * *